us007038830B2

(12) United States Patent
Tsuboi et al.

(10) Patent No.: US 7,038,830 B2
(45) Date of Patent: May 2, 2006

(54) MICRO-OSCILLATION ELEMENT

(75) Inventors: Osamu Tsuboi, Kawasaki (JP); Norinao Kouma, Kawasaki (JP); Hisao Okuda, Kawasaki (JP); Hiromitsu Soneda, Kawasaki (JP); Satoshi Ueda, Kawasaki (JP); Ippei Sawaki, Kawasaki (JP); Yoshitaka Nakamura, Yokohama (JP)

(73) Assignees: Fujitsu Limited, Kawasaki (JP); Fujitsu Media Devices Limited, Yokohama (JP)

( * ) Notice: Subject to any disclaimer, the term of this patent is extended or adjusted under 35 U.S.C. 154(b) by 48 days.

(21) Appl. No.: 10/926,053

(22) Filed: Aug. 26, 2004

(65) Prior Publication Data

US 2005/0231787 A1    Oct. 20, 2005

(30) Foreign Application Priority Data

Apr. 20, 2004    (JP) .............................. 2004-124438

(51) Int. Cl.
*G02B 26/08* (2006.01)
*G02B 26/00* (2006.01)

(52) U.S. Cl. ...................................... 359/290; 359/291
(58) Field of Classification Search ................. 359/290
See application file for complete search history.

(56) References Cited

U.S. PATENT DOCUMENTS 6,287,885 B1    9/2001    Muto et al.
6,449,406 B1 *  9/2002    Fan et al. ...................... 385/17
6,671,078 B1 * 12/2003    Flanders et al. ............ 359/254

FOREIGN PATENT DOCUMENTS

JP    10-190007    7/1998
JP    10-270714    10/1998
JP    2000-31502    1/2000

* cited by examiner

*Primary Examiner*—Scott J. Sugarman
*Assistant Examiner*—Richard Hanig
(74) *Attorney, Agent, or Firm*—Armstrong, Kratz, Quintos, Hanson & Brooks, LLP

(57) ABSTRACT

A micro-oscillation element includes a frame, a movable functional part, a driving mechanism, a beam extending from the functional part to the driving mechanism, and a torsion connector for connecting the frame and the beam to each other. The connector defines a rotational axis about which the functional part rotates. The rotational axis crosses the longitudinal direction of the beam. The beam is shorter than the functional part in the longitudinal direction of the rotational axis.

18 Claims, 19 Drawing Sheets

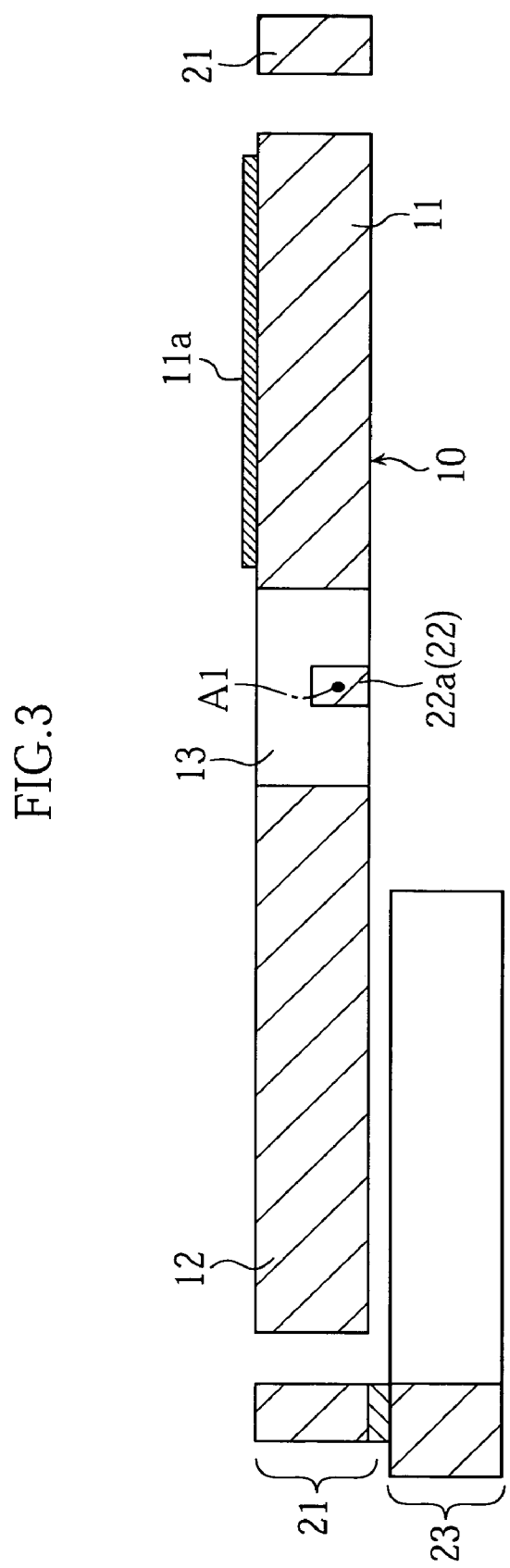

MICRO-OSCILLATION ELEMENT

BACKGROUND OF THE INVENTION

1. Field of the Invention

The present invention relates to a micro-oscillation element such as a micro-mirror element with a movable portion for which rotary displacement is possible.

2. Description of the Related Art

Recently the application of infinitesimal devices created by micro-machining technology are being attempted in various technical fields. In the field of optical communication technology, for example, micro-mirror elements with light reflecting functions are receiving attention.

In optical communications, an optical signal is transmitted by using an optical fiber as a medium, and furthermore, in general, an optical switching device is used in order to switch the transmission path of the optical signal from one fiber to another fiber. Characteristics required in an optical switching device in order to achieve good optical communications include high capacity, high speed and high reliability in the switching operation. From this point of view, expectations have been growing with regard to optical switching devices which incorporate micro-mirror elements fabricated by micro-machining technology. This is because the use of a micro-mirror element makes it possible to carry out switching processes on the optical signal itself, without having to convert the optical signal to an electrical signal, between the optical transmission path on the input side of the optical switching device and the optical transmission path on the output side thereof, and this means that it is suitable for obtaining the above-described characteristics.

A micro-mirror element is provided with a mirror surface for reflecting light, and it is capable of changing the direction of light reflection by oscillation of the mirror surface. Electrostatic drive-type micro-mirror elements which use electrostatic force in order to cause the mirror surface to oscillate are used in many devices. Electrostatic drive-type micro-mirror elements can be divided broadly into two types: micro-mirror elements manufactured by so-called surface micro-machining technology, and micro-mirror elements manufactured by so-called bulk micro-machining technology.

In the case of surface micro-machining technology, a thin layer of material corresponding to a respective constituent area is formed on a substrate and processed into a prescribed pattern, and such patterns are layered in a sequential fashion, whereby respective areas constituting an element, such as a support, an oscillating portion, a mirror surface and an electrode section, are formed. In addition to these portions, a sacrificial layer, which is subsequently removed, is also formed. On the other hand, in the case of bulk micro-machining technology, a support and an oscillating portion are formed in a prescribed shape by etching the material substrate. Thereafter, a mirror surface and an electrode is formed by a thin-layer forming process. Bulk micro-machining technology is described, for example, in Japanese Patent Laid-Open No. (Hei)10-190007, Japanese Patent Laid-Open No. (Hei)10-270714 and Japanese Patent Laid-Open No. 2000-31502.

One technical feature required in a micro-mirror element is that the mirror surface which performs light reflection has a high degree of flatness. However, in the case of surface micro-machining technology, since the mirror surface ultimately formed is thin, the mirror surface is liable to curve, and consequently, it is difficult to achieve a high degree of flatness in a mirror surface having a large surface area. On the other hand, in the case of bulk micro-machining technology, a mirror section is constituted by cutting into the material substrate, which is relatively thick, by means of an etching process, and since a mirror surface is provided on this mirror section, it is possible to ensure rigidity, even if the mirror surface has a large surface area. Consequently, it is possible to form a mirror surface having a sufficiently high degree of optical flatness.

FIGS. 20–21 illustrate a conventional electrostatically driven micro-mirror element X5 fabricated by the bulk micro-machining technology. FIG. 20 is an exploded view showing the micro-mirror element X5, while FIG. 21 is a cross-sectional view along line XXI—XXI in FIG. 20 of the micro-mirror element X5 in the assembled state.

The micro-mirror element X5 has a structure in which a mirror substrate 200 and a base substrate 206 are layered on each other. The mirror substrate 200 is constituted by a mirror supporting section 201, a frame 202, and a pair of torsion bars 203 linking the section 201 and the frame 202. By performing etching from one side of a material substrate, such as a silicon substrate having electrical conductivity, it is possible to form the outline shape of the mirror supporting section 201, frame 202 and torsion bars 203 on the mirror substrate 200. A mirror surface 204 is provided on the upper surface of the mirror supporting section 201. A pair of electrodes 205a, 205b are provided on the lower surface of the mirror supporting section 201. The pair of torsion bars 203 defines a rotational axis A5 for the rotational operation of the mirror supporting section 201. The base substrate 206 is provided with two electrodes 207a and 207b which oppose the electrodes 205a and 205b of the mirror supporting section 201, respectively.

In the micro-mirror element X5, when an electric potential is applied to the frame 202 of the mirror substrate 200, the electric potential is transmitted to the electrodes 205a and 205b, through the torsion bars 203 and the mirror supporting section 201, which are formed integral with the frame 202 from the same conductive material. Consequently, by applying a prescribed electric potential to the frame 202, it is possible to charge the electrodes 205a and 205b, positively, for example. In this state, if the electrode 207a of the base substrate 206 is charged with a negative charge, then an electrostatic attraction is generated between the electrode 205a and the electrode 207a, and hence the mirror supporting section 201 rotates in the direction of the arrow M5, as indicated in FIG. 21, whilst twisting the torsion bars 203. The mirror supporting section 201 is able to swing until it reaches an angle at which the force of attraction between the electrodes balances with the twisting resistance of the torsion bars 203. Alternatively, if a negative charge is applied to the electrode 207b whilst a positive charge is applied to the electrodes 205a, 205b of the mirror supporting section 201, then an electrostatic attraction is generated between the electrode 205b and the electrode 207b, and hence the mirror supporting section 201 will rotate in the opposite direction to the arrow M5. By driving the mirror supporting section 201 to swing as described above, it is possible to switch the direction of light reflected by the mirror surface 204.

In order to decrease the size of the micro-mirror element X5 in the longitudinal direction of the axis A5, it is necessary to make smaller the length L51 (see FIG. 20) of the mirror supporting section 201, or the length L52 of the frame 202, or the length L53 of the torsion bars 203. However, as the length L51 of the mirror-supporting section 201 becomes smaller, the area of the mirror surface 204 formed on the upper surface of the mirror supporting section 201 becomes smaller. Accordingly, it becomes difficult to obtain appropriate light-reflecting performance for the switching device. In addition, the reduction of the length L51 of the supporting section 201 leads to the reduction of the areas of the electrodes 205a, 205b formed on the lower surface of the supporting section 201. As the electrodes 205a, 205b have a smaller area, it is difficult to attain reduction of the driving voltage needed for operating the switching device. Turning to the frame 202, the length L52 should not be too small for giving required rigidity to the frame 202. Likewise, the length L53 of the torsion bars 203 should not be too small for ensuring appropriate mechanical properties (spring constant, strength, etc.) of the torsion bars.

As described above, the conventional micro-mirror element X5 has a structure with which the size reduction in the longitudinal direction of the axis A5 is difficult. Generally speaking, a micro-mirror element is required to provide a large rotational angle and high rotational speed, with low driving voltage. The conventional mirror element X5 cannot meet these requirements when it is reduced in size.

SUMMARY OF THE INVENTION

The present invention has been proposed under the circumstances described above. It is an object of the present invention to provide a micro-oscillation element with a structure suitable for attaining size reduction without compromising the required properties for the oscillation element.

According to a first aspect of the present invention, there is provided a micro-oscillation element comprising: a first frame; a movable functional part; a first driving mechanism; a beam extending from the functional part to the driving mechanism; and a first torsion connector for connecting the frame and the beam to each other, the connector defining a first rotational axis about which the functional part rotates, the first rotational axis crossing a longitudinal direction of the beam. The beam is shorter than the functional part in a longitudinal direction of the rotational axis.

Preferably, the driving mechanism includes a first comblike electrode and a second comblike electrode cooperating to generate electrostatic force. The first comblike electrode is fixed to the beam, while the second comblike electrode is fixed to the frame.

Preferably, the micro-oscillation element further comprises a second driving mechanism which is connected to the functional part and is opposite in position to the beam with respect to the functional part.

Preferably, the first driving mechanism and the second driving mechanism generate driving force to rotate the functional part in a same direction.

Preferably, the second driving mechanism includes a first comblike electrode and a second comblike electrode cooperating to generate electrostatic force. The first comblike electrode is fixed to the functional part, while the second comblike electrode is fixed to the frame.

The micro-oscillation element of the first aspect may further comprise a second frame, a second torsion connector and an additional driving mechanism. The second torsion connector connects the first frame and the second frame to each other and defines a second rotational axis for additional rotation of the first frame. The additional driving mechanism is arranged to generate driving force for the additional rotation of the first frame.

Preferably, the first rotational axis and the second rotational axis are parallel to each other.

The micro-oscillation element of the first aspect may further comprise a posture adjusting mechanism for individually exerting posture adjusting force on two areas of the functional part that are spaced from each other in the longitudinal direction of the rotational axis.

Preferably, the posture adjusting mechanism includes a first flat electrode and a second flat electrode both facing the functional part, the first flat electrode and the second flat electrode being spaced from each other in the longitudinal direction of the rotational axis.

According to a second aspect of the present invention, there is provided a micro-oscillation element comprising: a frame; an oscillation member that includes a movable functional part, a first electrode, and a beam extending from the functional part to the first electrode; a torsion connector for connecting the frame and the beam to each other, the connector defining a rotational axis about which the oscillation member rotates, the rotational axis crossing a longitudinal direction of the beam; and a second electrode cooperating with the first electrode to generate driving force for the rotation of the oscillation member. The beam is shorter than the functional part in the longitudinal direction of the rotational axis.

Preferably, the first electrode comprises a comblike electrode, while the second electrode comprises another comblike electrode fixed to the frame.

Preferably, the micro-oscillation element of the second aspect may further comprise a base member, wherein the first electrode comprises a flat plate electrode, the second electrode comprising another flat plate electrode provided on the base member to face the first electrode.

The micro-oscillation element of the second aspect may further comprise a third electrode and a fourth electrode, wherein the third electrode is fixed to the functional part and is opposite in position to the beam with respect to the functional part, the fourth electrode cooperating with the third electrode to generate driving force for the rotation of the oscillation member.

Preferably, the third electrode comprises a comblike electrode, the fourth electrode comprising another comblike electrode fixed to the frame.

According to a third aspect of the present invention, there is provided a micro-oscillation element comprising: a first frame and a second frame; a movable functional part; a first driving mechanism and a second driving mechanism; a first beam extending from the functional part to the first driving mechanism; a first torsion connector for connecting the first frame and the first beam to each other, the first torsion connector defining a first rotational axis about which the functional part rotates, the first rotational axis crossing a longitudinal direction of the first beam; a second beam extending from the first frame to the second driving mechanism; and a second torsion connector for connecting the second frame and the second beam to each other, the second torsion connector defining a second rotational axis about which the first frame rotates, the second rotational axis crossing a longitudinal direction of the second beam. The first beam is shorter than the functional part in a longitudinal direction of the first rotational axis, while the second beam is shorter than the first frame in a longitudinal direction of the second rotational axis.

Preferably, the first rotational axis and the second rotational axis are parallel to each other.

Preferably, the first driving mechanism includes a first comblike electrode and a second comblike electrode cooperating to generate electrostatic force. The first comblike electrode is fixed to the first beam, while the second comblike electrode is fixed to the first frame.

Preferably, the second driving mechanism includes a first comblike electrode and a second comblike electrode cooperating to generate electrostatic force. The first comblike electrode is fixed to the second beam, while the second comblike electrode is fixed to the second frame.

Other features and advantages of the present invention will become apparent from the detailed description given below with reference to the accompanying drawings.

BRIEF DESCRIPTION OF THE DRAWINGS

FIG. 3 is a sectional view taken along lines III—III in FIG. 1;

DETAILED DESCRIPTION OF THE PREFERRED EMBODIMENTS

Preferred embodiments of the present invention will be described below with reference to the accompanying drawings.

Figure 1:
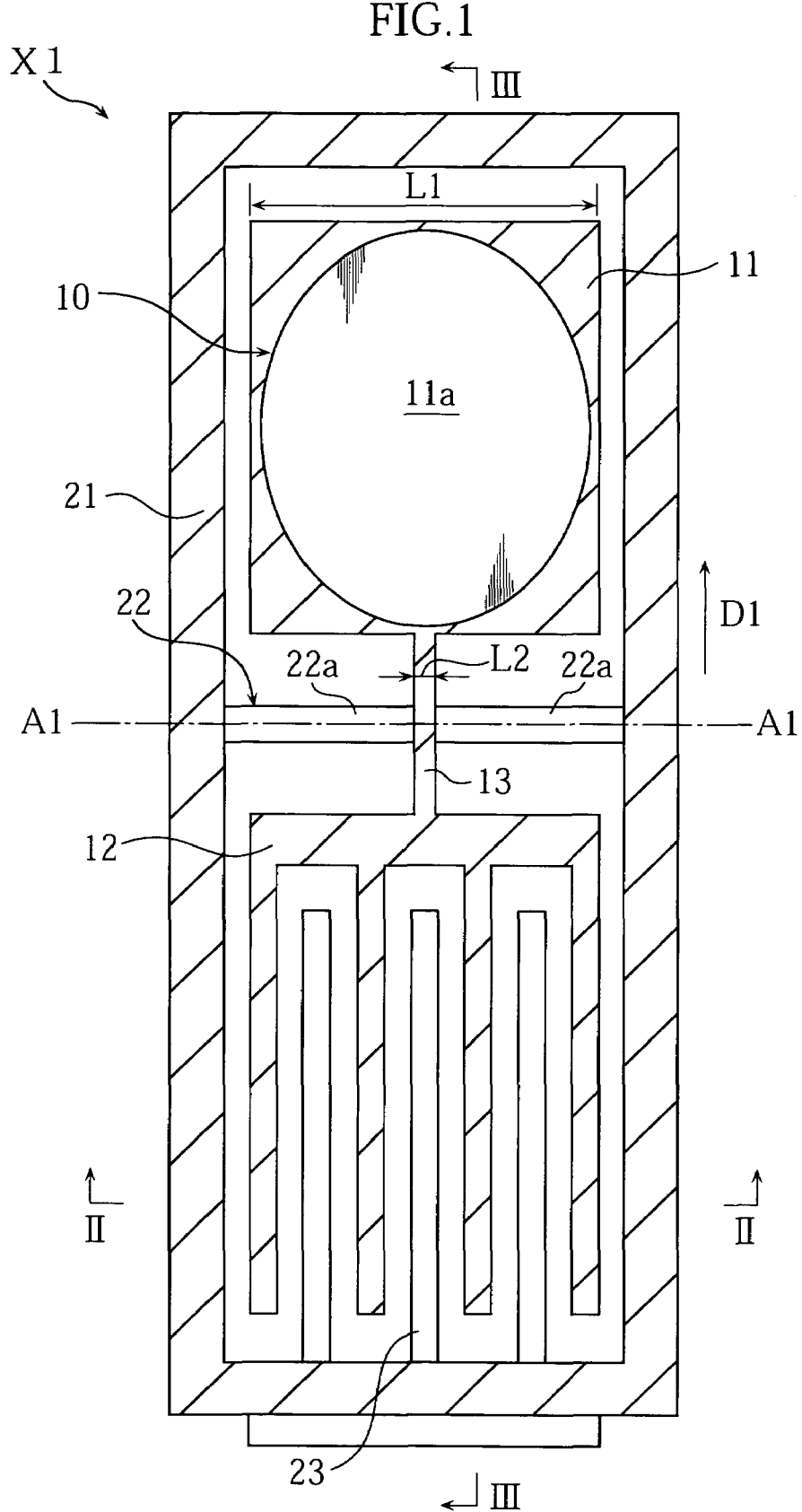
FIG. 1 is a plan view showing a micro-mirror element according to a first embodiment of the present invention.
Figure 2:
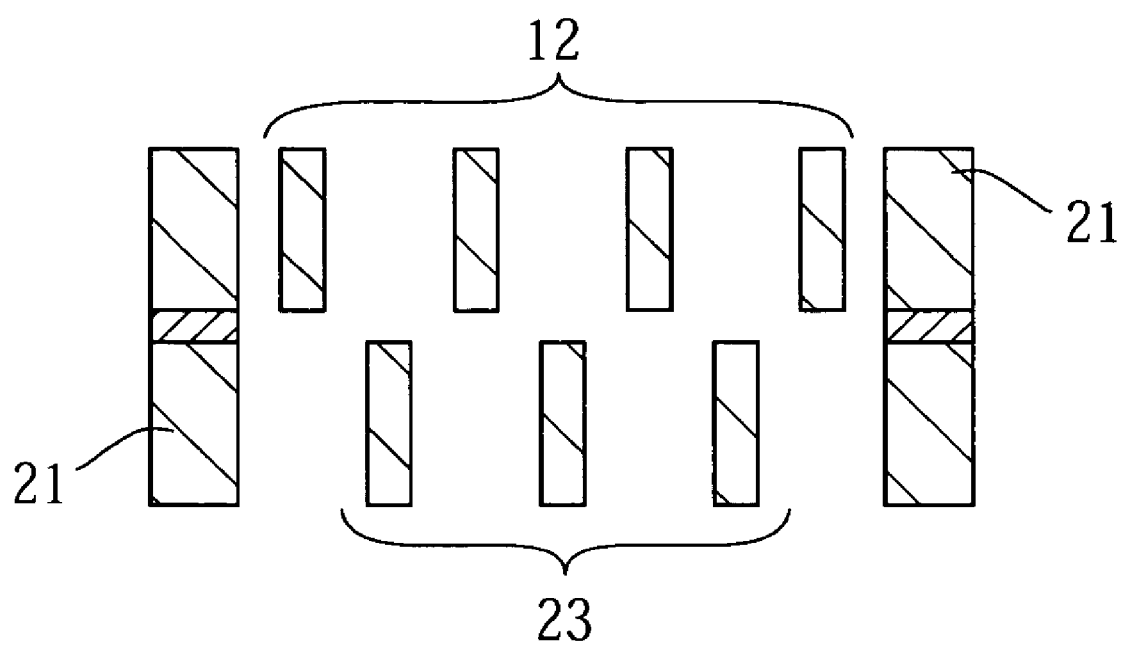
FIG. 2 is a sectional view taken along lines II—II in FIG. 1.

FIGS. 1–3 illustrate a micro-mirror element X1 according to a first embodiment of the present invention. As noted above, FIG. 1 is a plan view showing the element X1. FIG. 2 is a sectional view taken along lines II—II in FIG. 1, while FIG. 3 is a sectional view taken along lines III—III in FIG. 1.

The micro-mirror element X1 comprises an oscillation member 10, a frame 21, a torsion connector 22, and a stationary comblike electrode 23.

The oscillation member 10 includes a mirror supporting section 11, a movable comblike electrode 12, and a beam 13. The mirror supporting section 11 has an upper surface provided with an oval mirror 11a for reflecting light. The mirror supporting section 11 may be made of a silicon material, and the mirror 11a may be made of gold, for example. In this specification, the assembly of the mirror supporting section 11 and the mirror 11a formed thereon may be referred to as a movable "functional part". As shown in FIG. 1, the mirror supporting section 11 has a width L1 in a range of 20–200 μm, for example. The comblike electrode 12 may be made of an electroconductive silicon material. The beam 13, elongated in the direction indicated by an arrow D1, connects the mirror supporting section 11 and the comblike electrode 12 to each other. The beam 13 has a width L2 in a range of 3–30 μm, for example. The width L2 of the beam is smaller than the width L1 of the mirror supporting section. The beam 13 may be made of an electroconductive silicon material, for example.

The frame 21 is rectangular and surrounds the oscillation member 10. The frame 21 may be made of a silicon material. Though not shown in the figure, the frame 21 is provided with an internal conduction path extending through the inside of the frame body.

The torsion connector 22 comprises a pair of torsion bars 22a. Each torsion bar 22a extends between the beam 13 of the oscillation member 12 and the frame 21 for connecting the beam 13 and the frame 21. As shown in FIG. 3, the torsion bars 22a are smaller in thickness (dimension measured vertically in FIG. 3) than the beam 13 and the frame 21. The torsion connector 22 (or the paired torsion bars 22a) defines a rotational axis A1 about which the oscillation member 10 (and hence the mirror supporting section 11) is rotated. As shown in FIG. 1, the axis A1 extends perpendicularly to the D1-direction, thereby crossing the beam 13 at the right angle. Preferably, the axis A1 passes through or near the gravity center of the oscillation member 10. The torsion bars 22a may be made of an electroconductive silicon material, so that the above-mentioned internal conduction path (provided inside the frame 21) is electrically connected to the beam 13 via the torsion bars 22a.

As shown in FIG. 3, the stationary comblike electrode 23 is fixed to the frame 21. In operation, an electrostatic force is generated between the stationary comblike electrode 23 and the movable comblike electrode 12. The stationary comblike electrode 23 may be made of an electroconductive silicon material, for example. In a non-operating state or standby state of the oscillation member 10, as shown in FIGS. 2 and 3, the two comblike electrodes 12, 23 are horizontal and located at different heights. Also, as shown in FIGS. 1 and 2, the two comblike electrodes 12, 23 are laterally offset from each other for avoiding interference which otherwise would occur when the oscillation member 10 is operated.

FIGS. 4A–4D and 5A–5D show a method of making the micro-mirror element X1 described above. The illustrated method employs the MEMS (Micro Electro Mechanical Systems) technology, a kind of bulk micro-machining technology. Through the figures, a series of sectional views are provided for showing how the elements shown in FIG. 5D (i.e., the mirror supporting section M, the beam B, the frame portions F1–F2, the torsion bars T1–T2, and the comblike electrodes E1–E2) are made. It should be noted here that each of the sectional views is not taken along a straight line, but taken along a bent line (having several straight segments) to show particular portions of a single micro-mirror element to be formed in the material substrate (i.e., a wafer having a multilayer structure). As will be understood from the explanation below, the mirror supporting section M corresponds to a part of the above-mentioned mirror supporting section 11 (see FIG. 1). Similarly, the beam B corresponds to the beam 13 (shown in cross section), the frame portions F1–F2 to the frame 21 (shown in cross section), the torsion bar T1 to one torsion bar 22a (shown in longitudinal section), the torsion bar T2 to the other torsion bar 22a (shown in cross section), the comblike electrode E1 to the movable comblike electrode 12 (shown in cross section of the teeth of the comb), and the comblike electrode E2 to the stationary comblike electrode 23 (shown in cross section of the teeth of the comb).

Figure 4A:
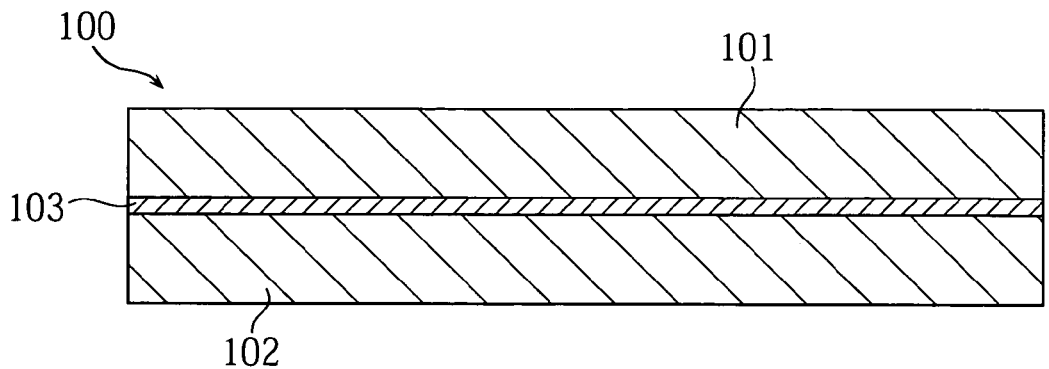
FIGS. 4A–4D are sectional views illustrating some steps of a fabrication process of the micro-mirror element of the first embodiment.

Specifically, the micro-mirror element X1 is made in the following manner. First, a material substrate 100 as shown in FIG. 4A is prepared. The material substrate 100 is an SOI (Silicon On Insulator) substrate with a multilayer structure consisting of an upper silicon layer 101, a lower silicon layer 102, and an insulating layer disposed between the upper and the lower silicon layers 101, 102. The silicon layers 101, 102 are made of a silicon material doped with impurities for electrical conductivity. The impurity may be a p-type impurity (e.g. boron) or a n-type impurity (e.g. phosphorus or antimony). The insulating layer 103 is made of silicon oxide, for example. The upper silicon layer 101 may have a thickness of 10–100 μm, while the lower silicon layer 102 may have a thickness of 50–500 μm. The insulating layer 103 may have a thickness of 0.3–3.0 μm.

Figure 4B:
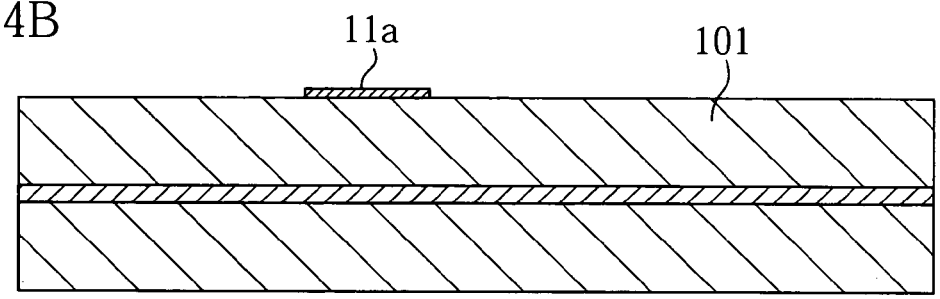

As shown in FIG. 4B, a mirror 11a is formed on the upper silicon layer 101. The mirror 11a may be formed in the following manner. First, a Cr layer (50 nm in thickness) is formed on the silicon layer 101, and an Au layer (200 nm in thickness) is formed on the Cr layer, both by sputtering. Then, with an appropriate mask formed on the Au layer, the two layers are subjected to etching to be processed into the mirror 11a. The etchant for the Au layer may be a potassium iodide-iodine solution, while the etchant for the Cr layer may be a di-ammonium cerium nitrate solution.

Figure 4C:
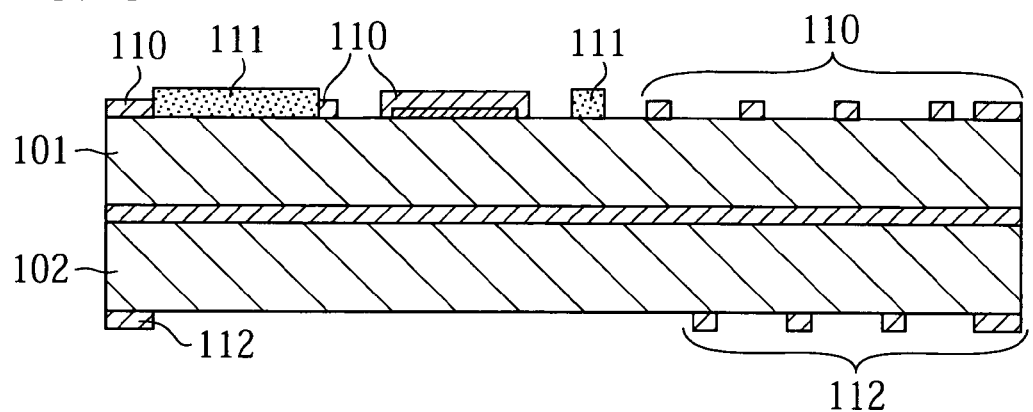

As shown in FIG. 4C, an oxide film pattern 110 and a resist pattern 111 are formed on the upper silicon layer 101, while an oxide film pattern 112 is formed on the lower silicon layer 102. The oxide film pattern 110 has a prescribed configuration corresponding to the oscillation member 10 (the mirror supporting section M, the beam B, the comblike electrode E1) and the frame 21 (the frame portions F1, F2). The resist pattern 111 has a prescribed configuration corresponding to the torsion bars 22a (the torsion bars T1, T2). The oxide film pattern 112 has a prescribed configuration corresponding to the frame 21 (the frame portions F1, F2) and the stationary comblike electrode 23 (the comblike electrode E2).

Figure 4D:
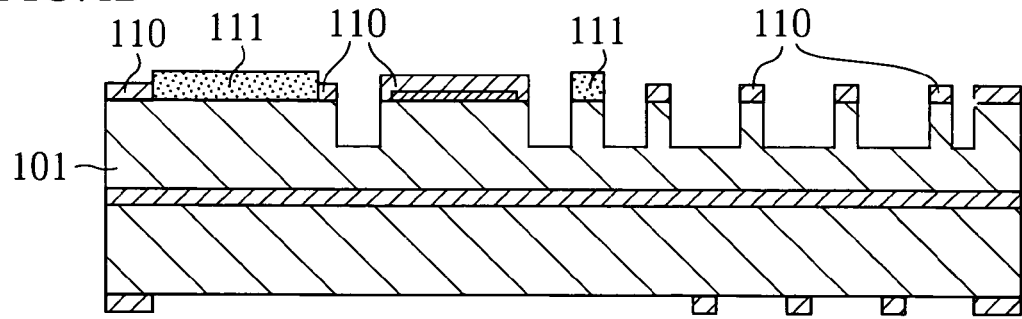

As shown in FIG. 4D, with the oxide film pattern 110 and the resist pattern 111 used as a mask, the upper silicon layer 101 is subjected to DRIE (Deep Reactive Ion Etching) until a prescribed depth is reached. This depth, which may be 5 μm for example, corresponds to the thickness of the torsion bars T1, T2. The DRIE can be performed properly by the Bosch process whereby etching and side wall protection are alternately performed. For the DRIE to be described below, Bosch process may preferably be employed.

Figure 5A:
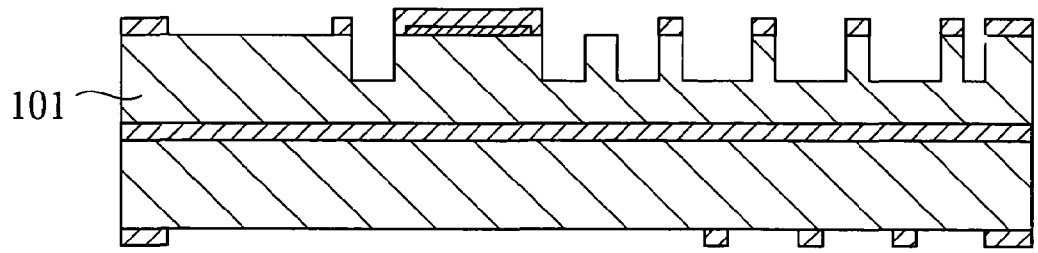
FIGS. 5A–5D are sectional views illustrating some steps following the step shown in FIG. 4D.

Then, as shown in FIG. 5A, the resist pattern 111 is removed with the use of a parting agent. For the parting agent, use may be made of "AZ Remover 700" available from Clariant (Japan) K.K.

Figure 5B:
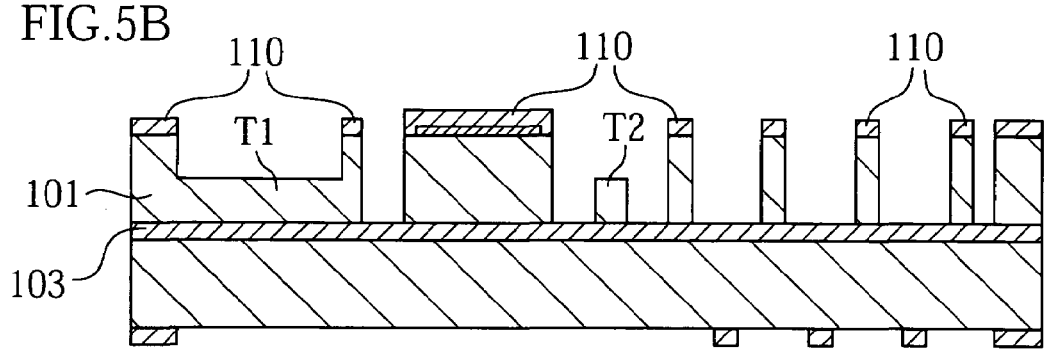

As shown in FIG. 5B, with the oxide film pattern 110 used as a mask, the upper silicon layer 101 is subjected to DRIE until the insulating layer 103 is reached, so that the torsion bars T1, T2 are formed as remaining parts. By this etching process, the oscillation member 10 (the mirror supporting section M, the beam B, the comblike electrode E1), the torsion bars 22a (the torsion bars T1, T2), and a part of the frame 21 (the frame portions F1, F2) are formed.

Figure 5C:
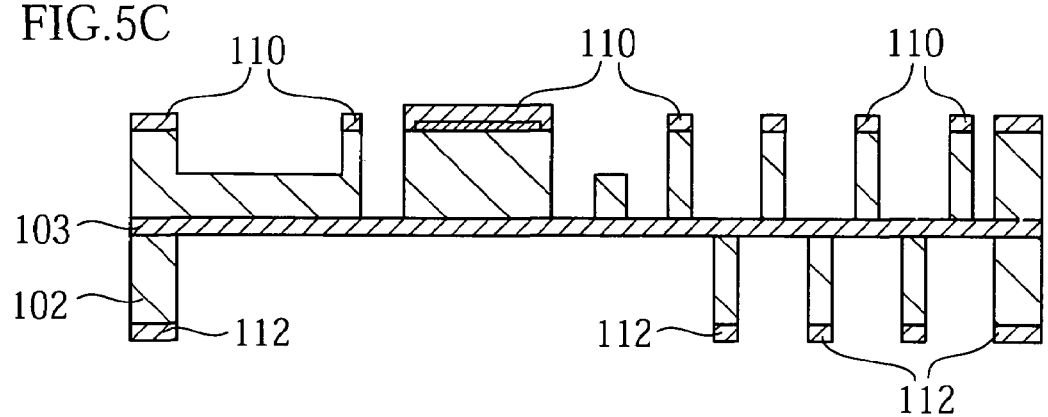

As shown in FIG. 5C, with the oxide film pattern 112 used as a mask, the lower silicon layer 102 is subjected to DRIE until the insulating layer 103 is reached. As a result, a part of the frame 21 (the frame portions F1, F2) and the comblike electrode E2 (the stationary comblike electrode 23) are formed.

Figure 5D:
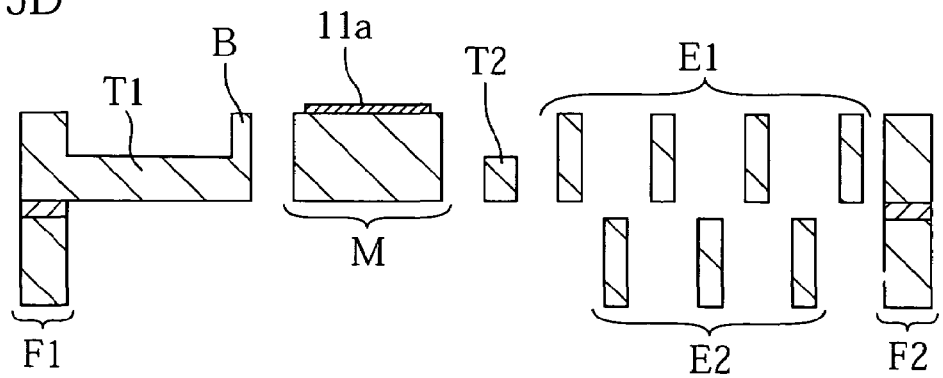

As shown in FIG. 5D, the exposed portions of the insulating layer 103 and the oxide film patterns 110, 112 are removed by dry etching or wet etching, for example. For the dry etching, use may be made of etching gas such as $CF_4$ or $CHF_3$. For the wet etching, the etchant may be buffered hydrofluoric acid (BHF) containing hydrofluoric acid and ammonium fluoride.

Through the above-described steps, the mirror supporting section M, the beam B, the frame portions F1–F2, the torsion bars T1–T2, and the comblike electrodes E1–E2 are produced, whereby the desired micro-mirror element X1 is obtained.

Figure 6:
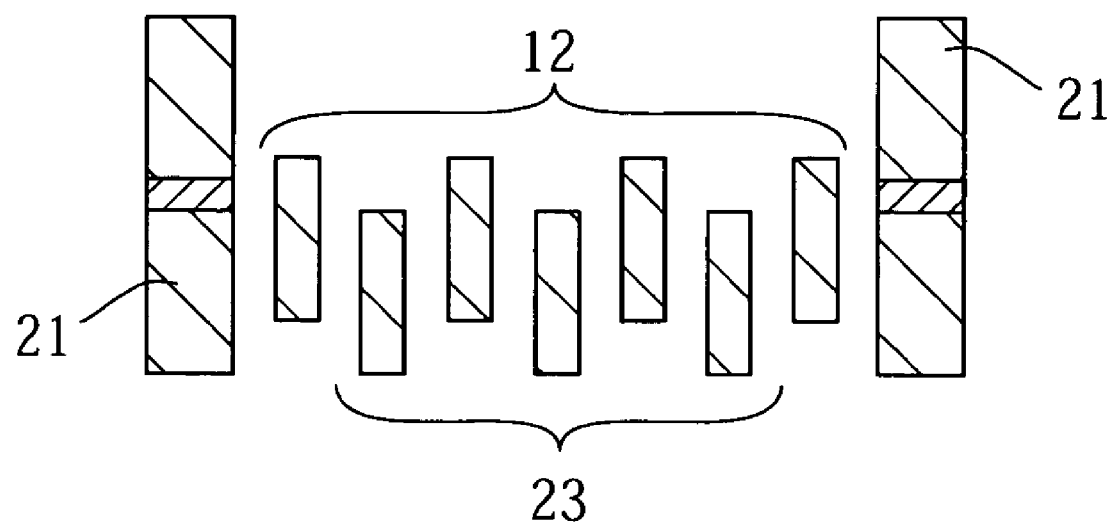
FIG. 6 is a sectional view taken along the lines II—II in FIG. 1, illustrating a state of operation of the micro-mirror element of the first embodiment.
Figure 7:
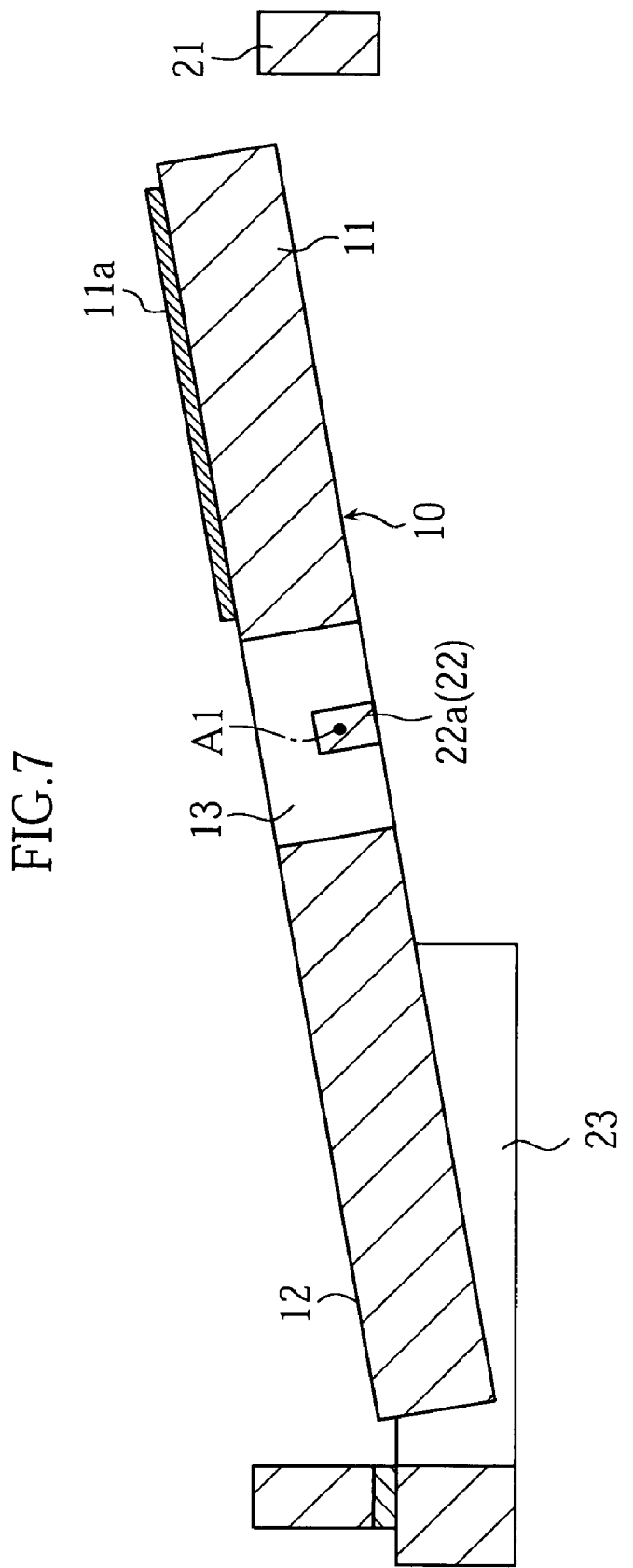
FIG. 7 is a sectional view taken along the lines III—III in FIG. 1, illustrating a state of operation of the micro-mirror element of the first embodiment.

In the micro-mirror element X1, the comblike electrodes 12, 13 are charged to an appropriate potential, for causing the oscillation member 10 (and hence the mirror supporting section 11) to rotate about the rotational axis A1. The potential application to the movable comblike electrode 12 is realized through the internal conduction path (formed within the frame 21), the conductive torsion bars 22a, and the conductive beam 13. Preferably, the comblike electrode 12 may be grounded. When an electrostatic force is generated between the movable and the stationary electrodes 12, 23, the oscillation member 10 rotates about the axis A1, and stops when the electrostatic force and the restoring force of the torsion bars 22a balance. In the balanced state, the two electrodes 12 and 23 take such positions as shown in FIGS. 6 and 7. As readily understood, the maximum rotation angle of the oscillation member 10 can be adjusted by varying the potential level applied to the comblike electrodes 12, 23. When the electrostatic force is removed, on the other hand, the torsion bars 22a restore to the original state (natural state), thereby bringing the oscillation member 10 into the horizontal position as shown in FIG. 3. With such an operation of the oscillation member 10, it is possible to change the direction of light reflected by the mirror 11a formed on the mirror supporting section 11.

In the micro-mirror element X1, the torsion connector 22 (which defines the rotational axis A1 of the oscillation member 10) is narrower than the mirror supporting section 11, and connected to the beam 13 extending from the mirror supporting section 11. Further, the torsion connector 22 overlaps the mirror supporting section 11 in the longitudinal direction of the axis A1. With such an arrangement, both the mirror supporting section 11 and the torsion connector 22 can be sufficiently long in the longitudinal direction of the axis A1, while the element X1 as a whole can have a small size in the longitudinal direction of the axis A1. With such a large mirror supporting section and a long torsion connector, the micro-mirror element X1 exhibits a good light-reflecting performance.

According to the above embodiment, the driving mechanism is provided by a combination of two comblike electrodes 12 and 23. The present invention, however, is not limited to this arrangement. For instance, the driving mechanism may be constituted by two (or more) opposing flat conductive plates (or electrodes), between which electrostatic force is generated for causing the above-mentioned "functional part" to rotate about the rotational axis A1. In this case, one of the flat electrodes ("first flat electrode" below) may replace the comblike electrode 12 (and thus, it is connected to the mirror supporting section 11 via the beam 13). The other or second flat electrode may be provided on an additional base substrate (which may be fixed to the frame 21 from below) so as to face the first flat electrode.

Figure 8:
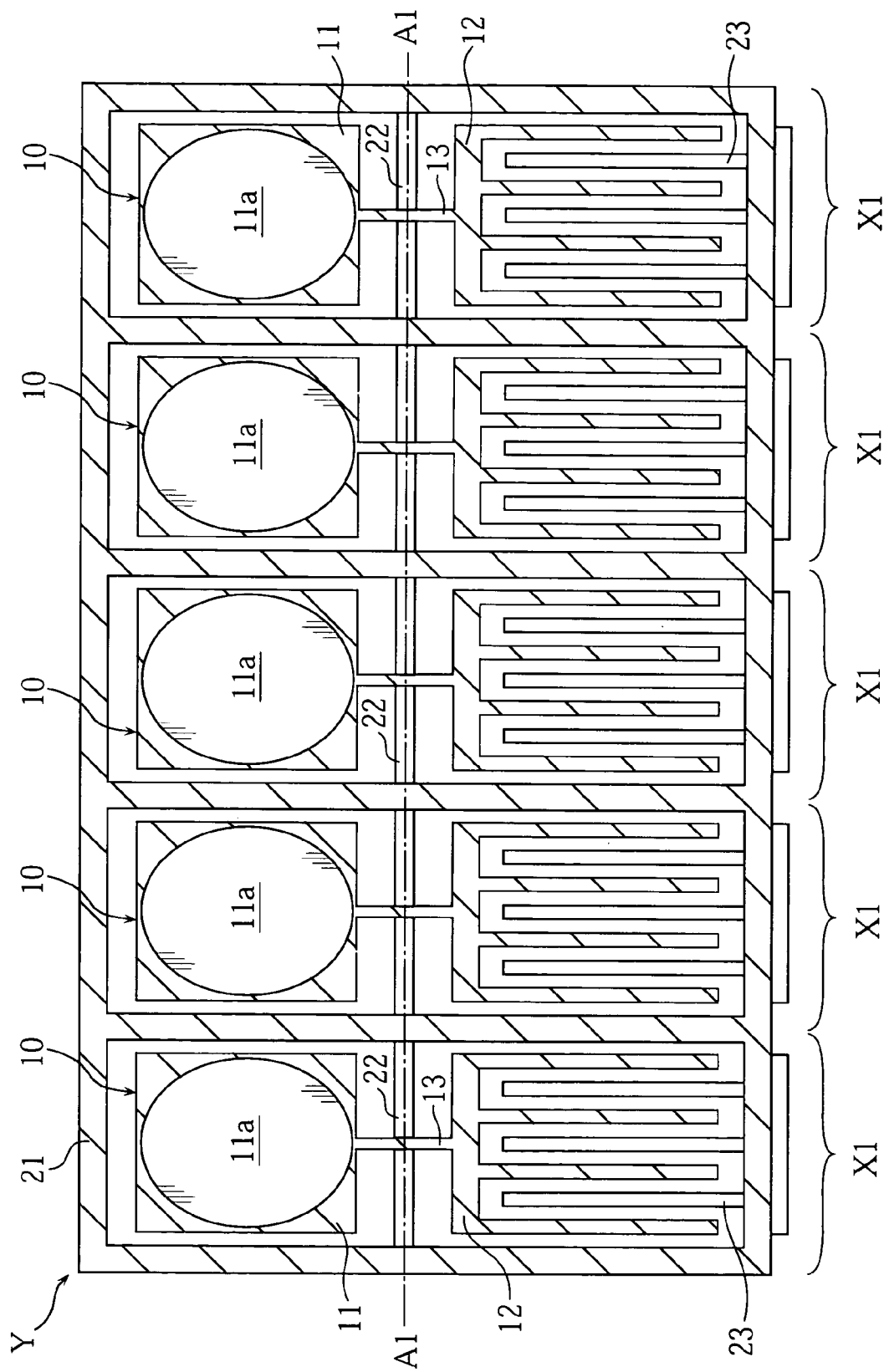
FIG. 8 is a plan view showing an micro-mirror array produced by utilizing a plurality of micro-mirror elements of the first embodiment.

FIG. 8 shows a micro-mirror array Y consisting of several micro-mirror elements X1 described above. In the illustrated example, five micro-mirror elements are combined into one unit, though the present invention is not limited to this particular number.

In the micro-mirror array Y, the five micro-mirror elements X1 are arranged in an array extending along the rotational axis A1. Accordingly, the mirrors 11a of the respective mirror elements are arranged in an array parallel to the axis A1. As discussed above, an individual micro-mirror element X1 is small in size in the longitudinal direction of the axis A1. Thus, the micro-mirror array Y can be small in the longitudinal direction of the axis A1. Further, in the array Y, any one of the mirrors 11a is located close to the neighboring mirror or mirrors 11a. Thus, all the mirrors 11a can be disposed in the longitudinal direction of the axis A1 with a high density.

Figure 9:
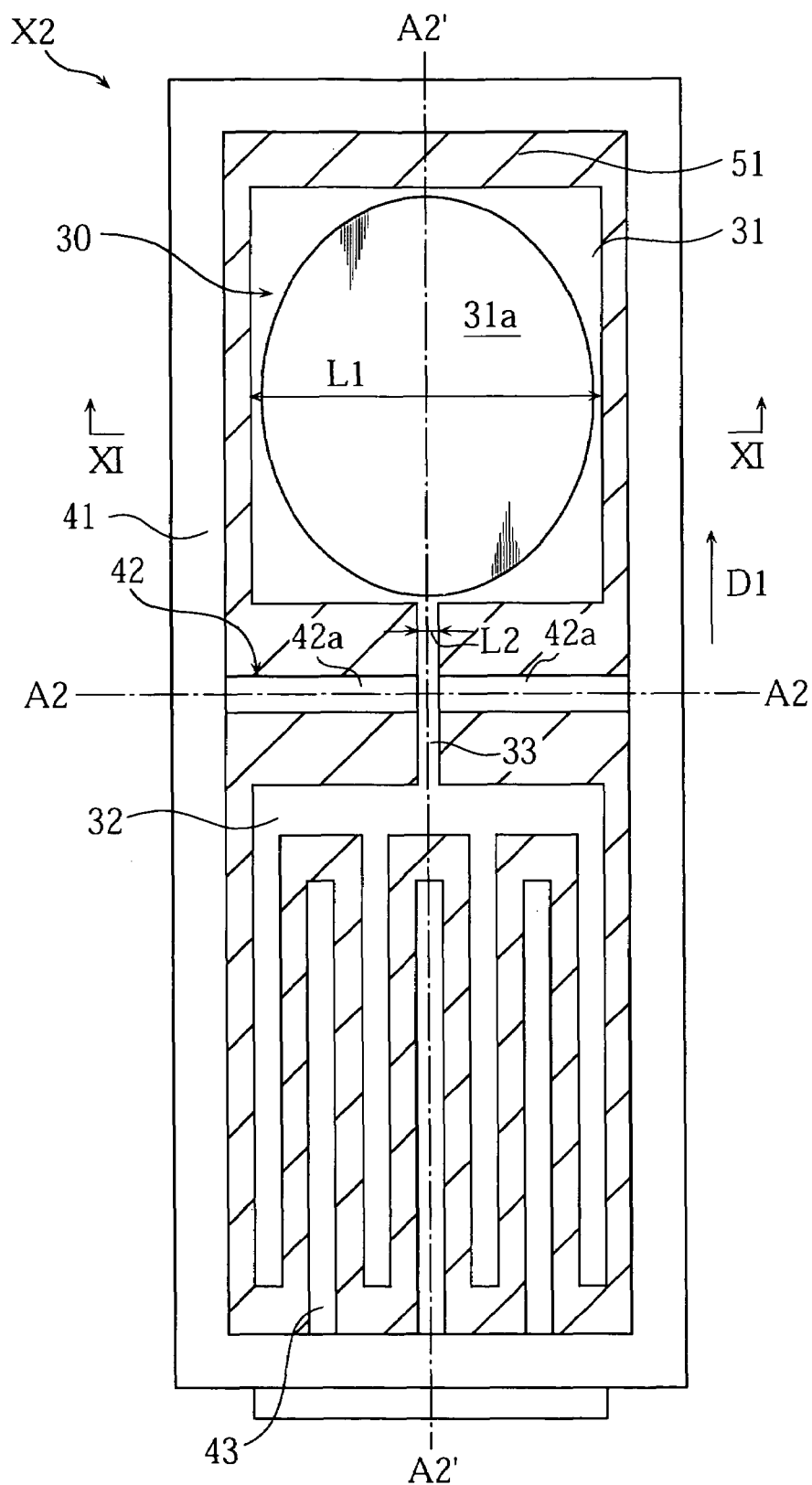
FIG. 9 is a plan view showing a micro-mirror element according to a second embodiment of the present invention.
Figure 10:
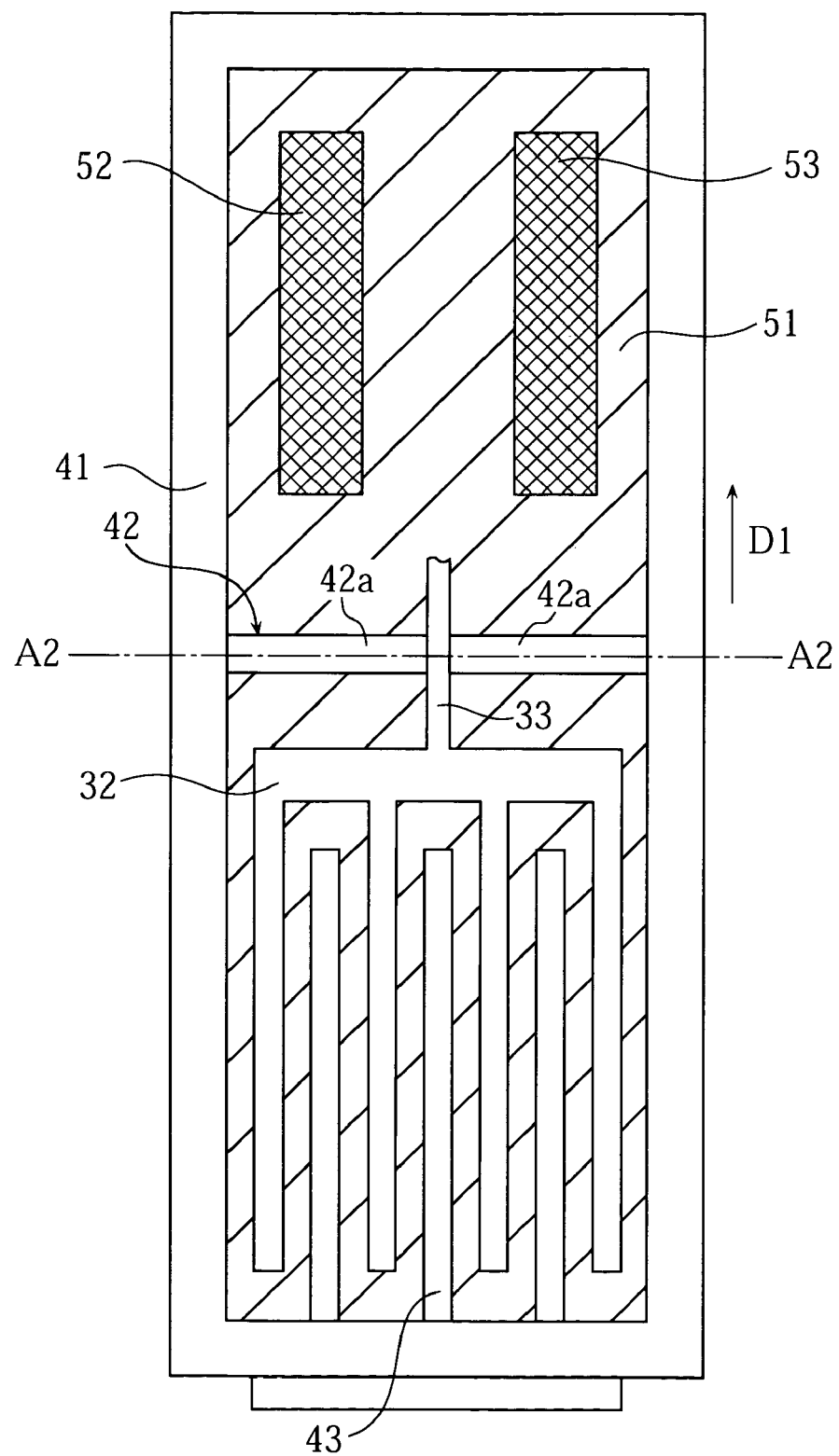
FIG. 10 is another plan view showing the micro-mirror element of the second embodiment, with a part thereof omitted for clarity of illustration.
Figure 11:
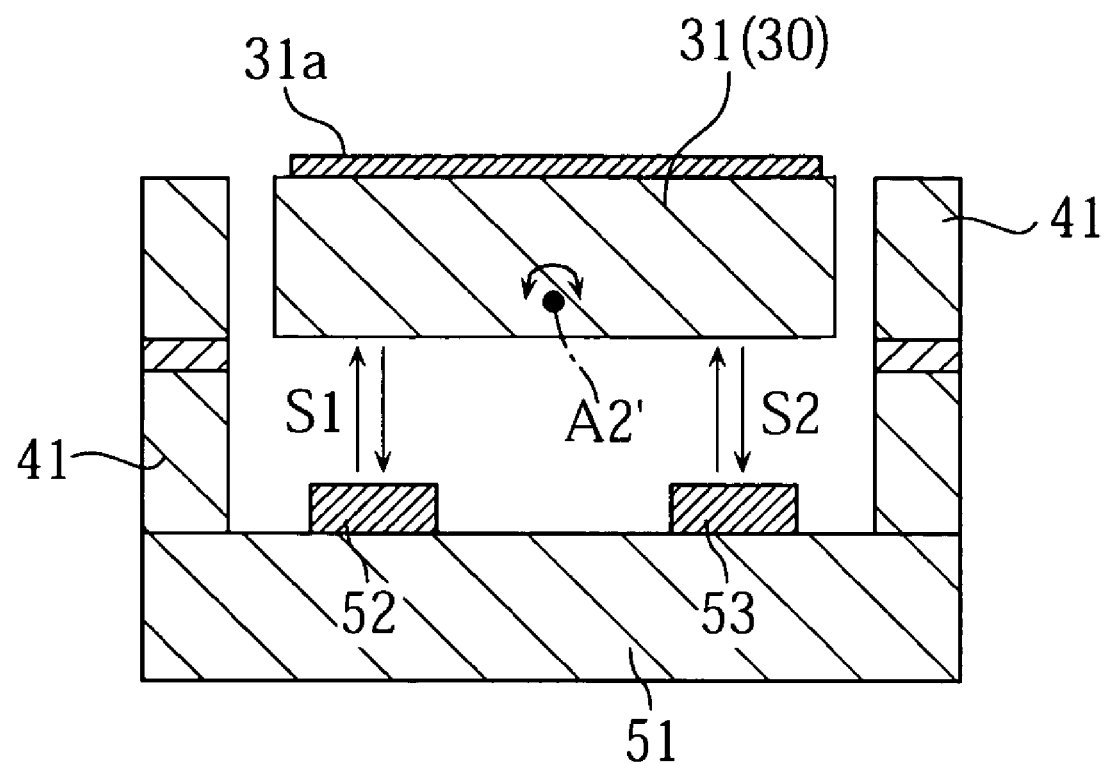
FIG. 11 is a sectional view taken along lines XI—XI in FIG. 9.

Reference is now made to FIGS. 9–11 illustrating a micro-mirror element X2 according to a second embodiment of the present invention. FIG. 9 is a plan view showing the element X2. FIG. 10 is another plan view, with the mirror supporting section being omitted for showing otherwise hidden components. FIG. 11 is a sectional view taken along lines XI—XI in FIG. 9.

The micro-mirror element X2 includes an oscillation member 30, a frame 41, a torsion connector 42, a stationary comblike electrode 43, a base substrate 51, and a pair of flat strip electrodes 52, 53.

The oscillation member 30 includes a mirror supporting section 31, a movable comblike electrode 32, and a beam 33. The mirror supporting section 31 has an upper surface provided with a mirror 31a for light reflection. The mirror supporting section 31 may be made of an electroconductive silicon material, while the mirror 31a may be made of gold. The mirror supporting section 31 and the mirror 31a formed thereon may collectively referred to as a movable "functional part" in this specification. As shown in FIG. 9, the mirror supporting section 31 has a length L1, which may be in a range of 20–200 µm. The structures of the comblike electrode 32 and the beam 33 are the same as those of the comblike electrode 12 and the beam 13 described above.

The frame 41 surrounds the oscillation member 30, and is made of a silicon material, for example. Though not shown in the figure, the frame 41 is provided with an internal conduction path extending through the inside of the frame body.

The torsion connector 42 comprises a pair of torsion bars 42a. Each of the torsion bars 42a is connected to the beam 33 of the oscillation member 30 and the frame 41

Each torsion bar 42a extends between the beam 33 and the frame 41 for connecting the beam 33 and the frame 41. The torsion bars 42a are smaller in thickness than the beam 33 and the frame 41 (as the torsion bars 22a shown in FIG. 3). The torsion connector 42 (or the paired torsion bars 42a) defines a rotational axis A2 about which the oscillation member 30 (and hence the mirror supporting section 31) is rotated. As shown in FIG. 9, the axis A2 extends perpendicularly to the D1-direction, thereby crossing the beam 33 at the right angle. Preferably, the axis A2 passes through or near the gravity center of the oscillation member 30. The torsion bars 42a may be made of an electroconductive silicon material, so that the above-mentioned internal conduction path (provided inside the frame 41) is electrically connected to the beam 33 via the torsion bars 42a.

The stationary comblike electrode 43 is fixed to the frame 41. In operation, an electrostatic force is generated between the stationary comblike electrode 43 and the movable comblike electrode 32. The stationary electrode 43 may be made of an electroconductive silicon material. In a non-operating state or standby state of the oscillation member 30, the two comblike electrodes 32, 43 are horizontal and located at different heights. Also, the two comblike electrodes 32, 43 are laterally offset from each other for avoiding interference which otherwise would occur when the oscillation member 30 is operated.

The base substrate 51, which may be made of silicon, is fixed to the frame 41, as shown in FIG. 11. The frame 41 and the base substrate 51 are attached to each other by flip chip bonding, for example. As shown in FIG. 10, the strip electrodes 52, 53 are formed on the base substrate 51, and spaced from each other in the longitudinal direction of the axis A2. Further, as shown in FIG. 11, the strip electrodes 52, 53 face the mirror supporting section 31. Though not shown in the figure, the electrodes 52, 53 are connected to a wiring pattern formed on the base substrate 51.

In the micro-mirror element X2, the comblike electrodes 32, 43 are charged to an appropriate potential, for causing the oscillation member 30 (and hence the mirror supporting section 31) to rotate about the rotational axis A2. The potential application to the movable comblike electrode 32 is realized through the internal conduction path (formed within the frame 41), the conductive torsion bars 42a, and the conductive beam 33. Preferably, the comblike electrode 32 may be grounded. As readily understood, the rotation angle of the oscillation member 30 can be adjusted by varying the potential level applied to the comblike electrodes 32, 43.

The micro-mirror element X2 has an additional feature, as described below, which the micro-mirror element X1 of the first embodiment does not have. Specifically, in the element X2, an electrostatic force can be generated between selected one of the strip electrodes 52, 53 and the mirror supporting section 31 (the section 31 is electrically connected to the movable comblike electrode 32 to be held at the same potential level as the electrode 32). Referring to FIG. 11, when the strip electrode 52 is charged to a prescribed potential, an electrostatic force S1 is generated between the electrode 52 and the supporting section 31. Similarly, when the strip electrode 53 is charged to a prescribed potential, an electrostatic force S2 is generated between the electrode 53 and the supporting section 31. Each force S1, S2 is attractive or repulsive, depending on the potential applied to the strip electrodes 52, 53.

With the above arrangement, it is possible to prevent the oscillation member 30 (and the mirror supporting section 31) from undergoing improper rotary displacement about an axis other than the rotational axis A2. In FIGS. 9 and 11, an example of improper axis is indicated by reference sign A2', which extends perpendicularly to the proper rotational axis A2.

Such a posture stabilizing function keeps the mirror supporting section 31 and hence the mirror 31a in parallel to the rotational axis A2. Thus, proper light reflection by the mirror 31a is ensured.

According to the present invention, the posture stabilization may be realized by a magnetic force instead of the above-described electrostatic force. Specifically, a permanent magnet is fixed to the lower surface of the mirror supporting section 31, while a pair of flat coils, being spaced from each other in the longitudinal direction of the axis A2, are provided on the base substrate 51 in place of the strip electrodes 52, 53. A wiring pattern, formed on the base substrate 51, may be connected to the flat coils for energizing the coils. In operation, an attractive or repulsive force is generated between the permanent magnet and the flat coils, whereby the oscillation member 30 is held in proper position. The strength of the magnetic force can be adjusted by varying the voltage applied to the coils.

Figure 12:
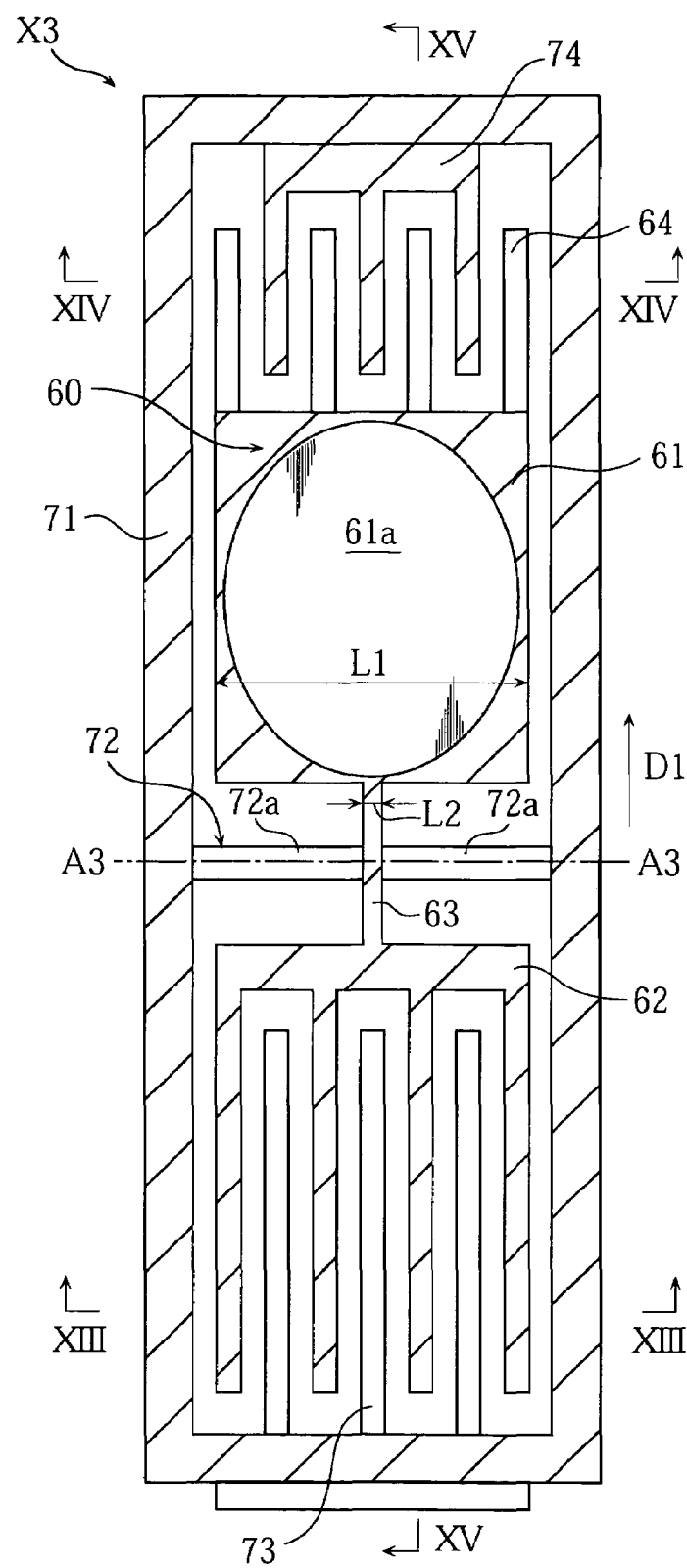
FIG. 12 is a plan view showing a micro-mirror element according to a third embodiment of the present invention.
Figure 13:
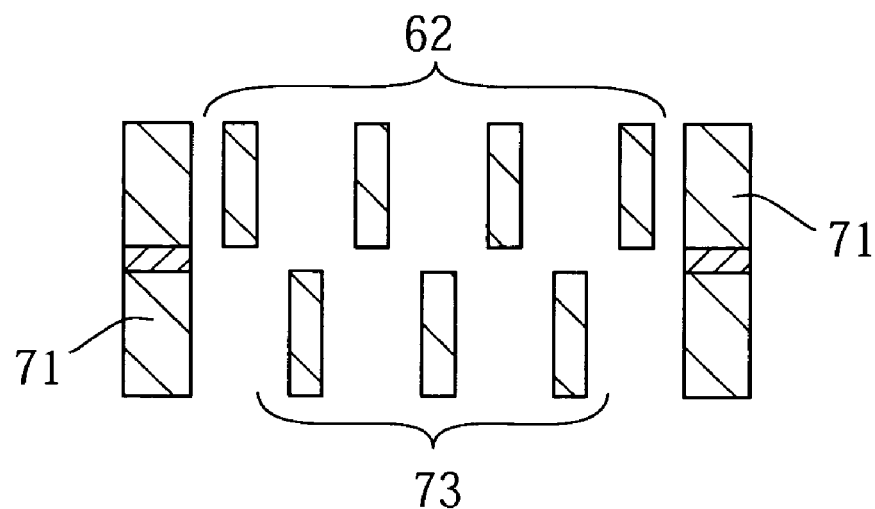
FIG. 13 is a sectional view taken along lines XIII—XIII in FIG. 12.
Figure 14:
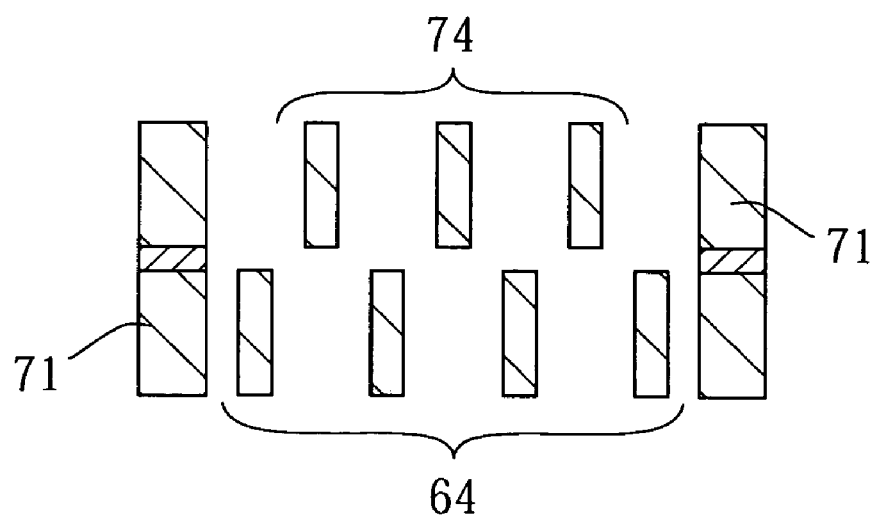
FIG. 14 is a sectional view taken along lines XIV—XIV in FIG. 12.
Figure 15:
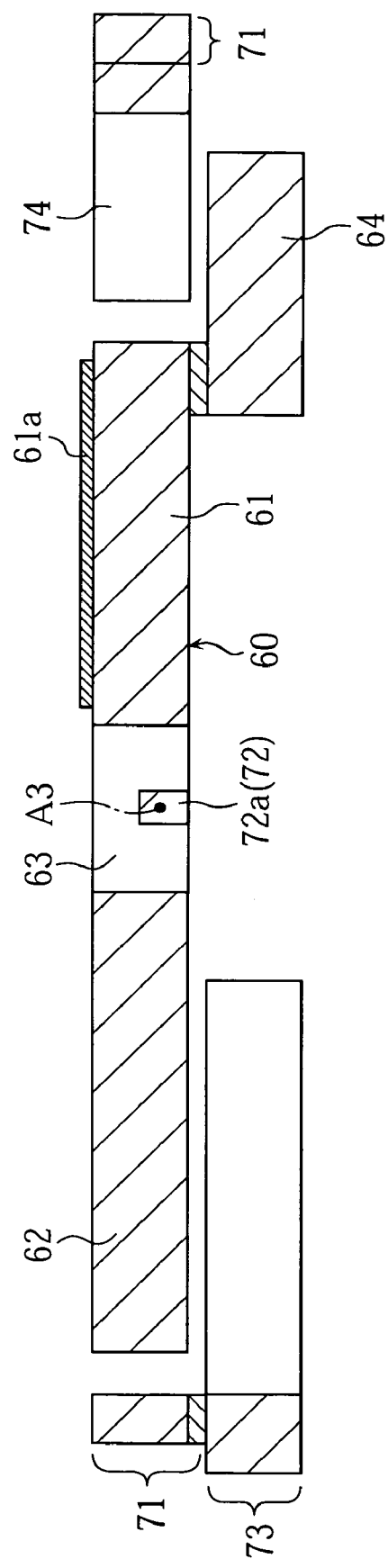
FIG. 15 is a sectional view taken along lines XV—XV in FIG. 12.

FIGS. 12–15 illustrate a micro-mirror element X3 according to a third embodiment of the present invention. FIG. 12 is a plan view of the element X3. FIGS. 13, 14 and 15 are sectional views taken along lines XIII—XIII, XIV—XIV and XV—XV in FIG. 12, respectively.

The micro-mirror element X3 includes an oscillation member 60, a frame 71, a torsion connector 72, and stationary comblike electrodes 73, 74.

The oscillation member 60 includes a mirror supporting section 61, movable comblike electrodes 62, 64, and a beam 63. The mirror supporting section 61 has an upper surface provided with a mirror 61a for light reflection. The mirror supporting section 61 may be made of an electroconductive silicon material, while the mirror 61a may be made of gold. In this specification, the assembly of the mirror supporting section 61 and the mirror 61a formed thereon may be referred to as a movable "functional part". As shown in FIG. 12, the mirror supporting section 61 has a width L1 in a range of 20–200 μm, for example. The structures of the comblike electrode 62 and the beam 63 are the same as those of the comblike electrode 12 and the beam 13 described above. The comblike electrode 64, which may be made of an electroconductive silicon material, is fixed to the mirror supporting section 61, as shown in FIG. 15. The comblike electrode 64 is electrically connected to the mirror supporting section 61 via conductive plugs (not shown) embedded in the electrode 64 and the section 61.

The frame 71 surrounds the oscillation member 60. The frame 21 may be made of a silicon material. Though not shown in the figure, the frame 71 is provided with an internal conduction path extending through the inside of the frame body.

The torsion connector 72 comprises a pair of torsion bars 72a. Each torsion bar 72a extends between the beam 63 of the oscillation member 60 and the frame 71 for connecting the beam 63 and the frame 71. As shown in FIG. 15, the torsion bars 72a are smaller in thickness than the beam 63 and the frame 71. The torsion connector 72 (or the paired torsion bars 72a) defines a rotational axis A3 about which the oscillation member 60 (and hence the mirror supporting section 61) is rotated. As shown in FIG. 12, the axis A3 extends perpendicularly to the D1-direction, thereby crossing the beam 63 at the right angle. Preferably, the axis A3 passes through or near the gravity center of the oscillation member 60. The torsion bars 72a may be made of an electroconductive silicon material, so that the above-mentioned internal conduction path (provided inside the frame 71) is electrically connected to the beam 63 via the torsion bars 22a.

As shown in FIG. 15, the comblike electrode 73 is fixed to the frame 71. In operation, an electrostatic force is generated between the comblike electrode 73 and the comblike electrode 62. The comblike electrode 73 may be made of an electroconductive silicon material, for example. In a non-operating state or standby state of the oscillation member 60, as shown in FIGS. 13 and 15, the two comblike electrodes 62, 73 are horizontal and located at different heights. Also, the two comblike electrodes 62, 73 are laterally offset from each other for avoiding interference which otherwise would occur when the oscillation member 60 is operated.

As shown in FIGS. 12 and 15, the comblike electrode 74 is fixed to the frame 71. In operation, an electrostatic force is generated between the comblike electrode 74 and the comblike electrode 64. The comblike electrode 74 may be made of an electroconductive silicon material, for example. In a non-operating state or standby state of the oscillation member 60, as shown in FIGS. 14 and 15, the two comblike electrodes 64, 74 are horizontal and located at different heights. Also, the two comblike electrodes 64, 74 are laterally offset from each other for avoiding interference which otherwise would occur when the oscillation member 60 is operated.

The micro-mirror element X3 may be fabricated from a material substrate by the MEMS technology, as described above with respect to the micro-mirror element X1 of the first embodiment.

In the micro-mirror element X3, the comblike electrodes 62, 64 and the oscillation member 60 are charged to an appropriate potential, while the comblike electrodes 73, 74 are charged to an appropriate potential for causing the oscillation member 60 (and hence the mirror supporting section 61) to rotate about the rotational axis A3. The potential application to the oscillation member 60 is realized through the internal conduction path (formed within the frame 71) and the conductive torsion bars 72a. Preferably, the oscillation member 60 and the comblike electrodes 62, 64 may be grounded. When an electrostatic force is generated between the comblike electrode 62 and the comblike electrode 73, and between the comblike electrode 64 and the comblike electrode 74, the electrode 62 is drawn into among the comblike teeth of the electrode 73, while the electrode 64 is drawn into among the comblike teeth of the electrode 74. Accordingly, the oscillation member 60 is rotated about the axis A3, and stops when the electrostatic force and the restoring force of the torsion bars 72a balance. As readily understood, the maximum rotation angle of the oscillation member 60 can be adjusted by varying the potential level applied to the comblike electrodes 73, 74.

The micro-mirror element X3 has two driving mechanisms: one provided by the comblike electrodes 62, 73 and the other provided by the comblike electrodes 64, 74. With such an arrangement, both driving mechanisms can cooperate to rotate the oscillation member 60 in the same direction about the axis A3. Accordingly, the driving voltage for the micro-mirror element X3 can be reduced in comparison with a single-driving mechanism system.

Figure 16:
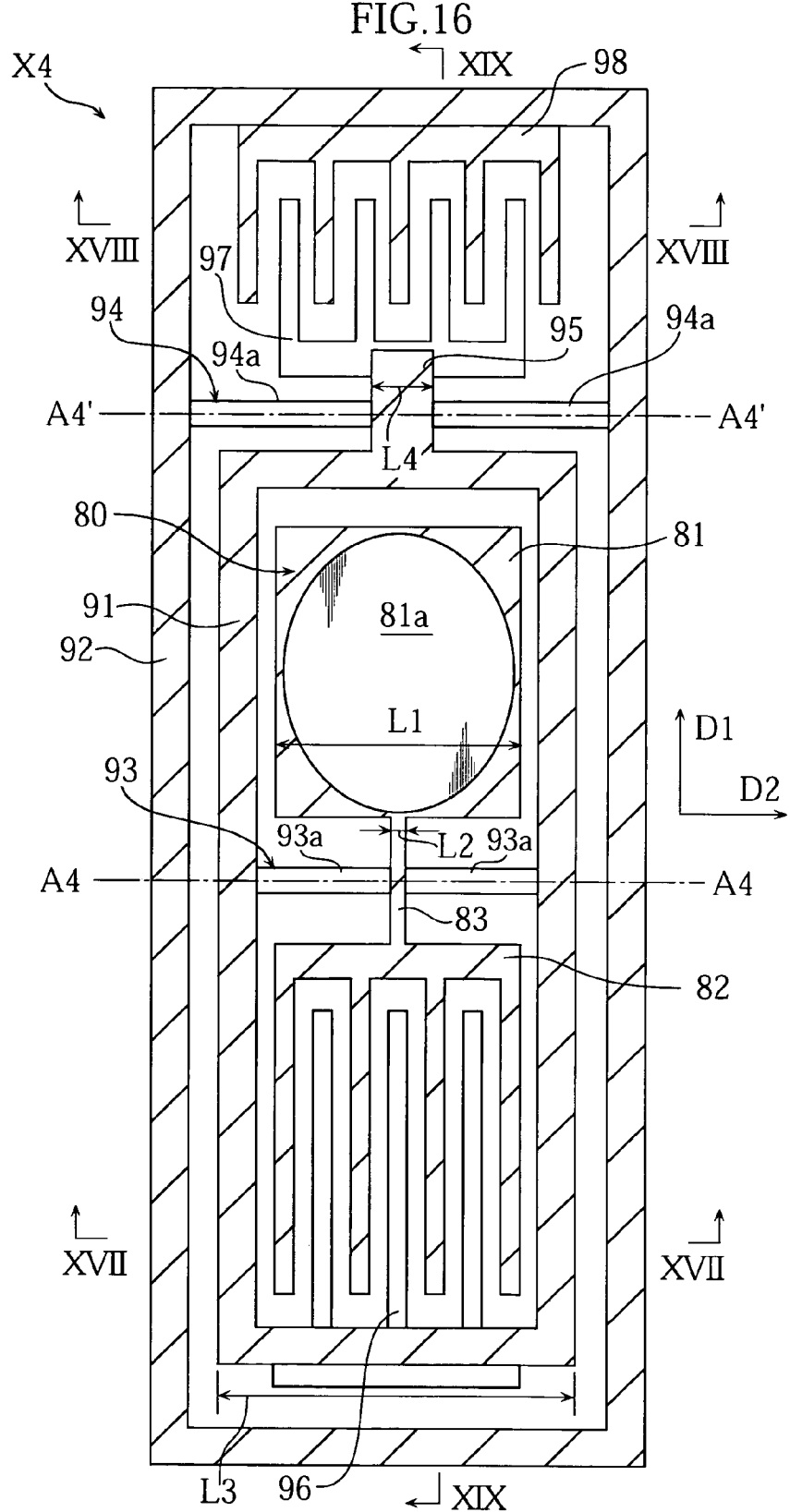
FIG. 16 is a plan view showing a micro-mirror element according to a fourth embodiment of the present invention.
Figure 17:
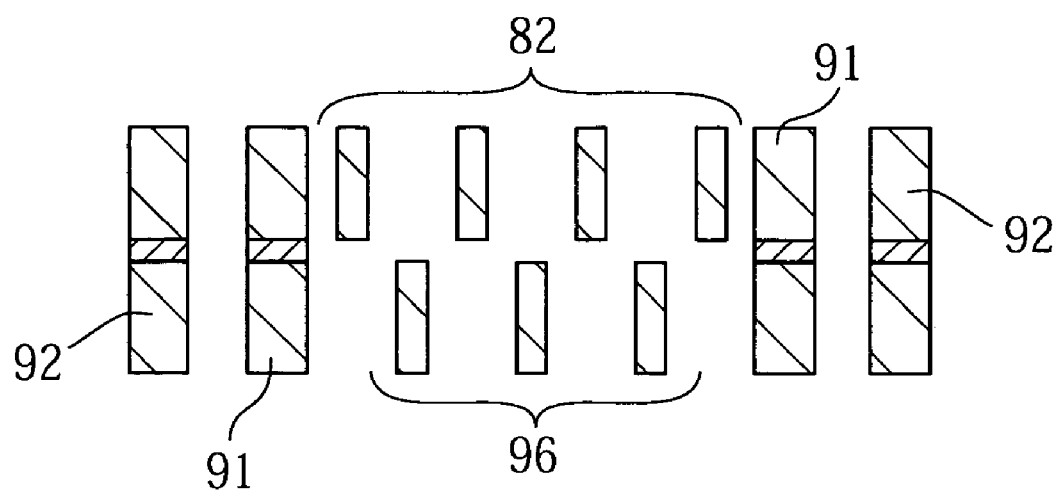
FIG. 17 is a sectional view taken along lines XVII—XVII in FIG. 16.
Figure 18:
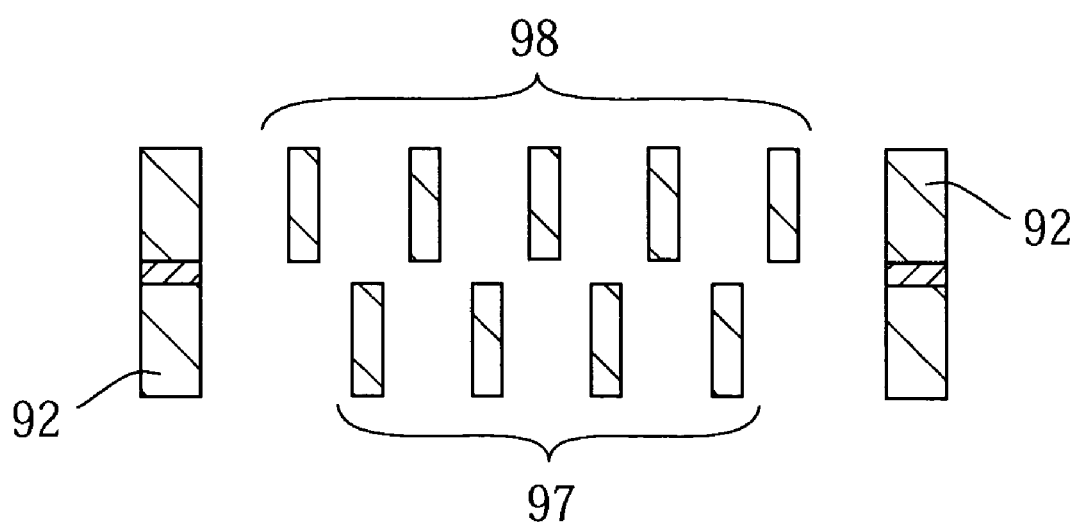
FIG. 18 is a sectional view taken along lines XVIII—XVIII in FIG. 16.
Figure 19:
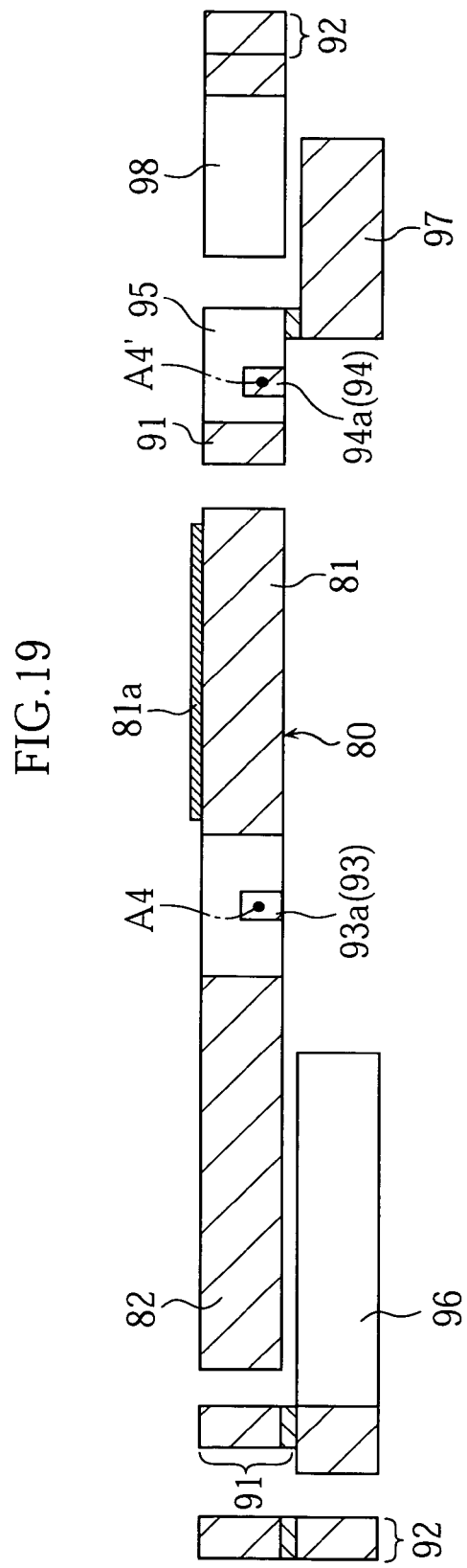
FIG. 19 is a sectional view taken along lines XIX—XIX in FIG. 16.
Figure 20:
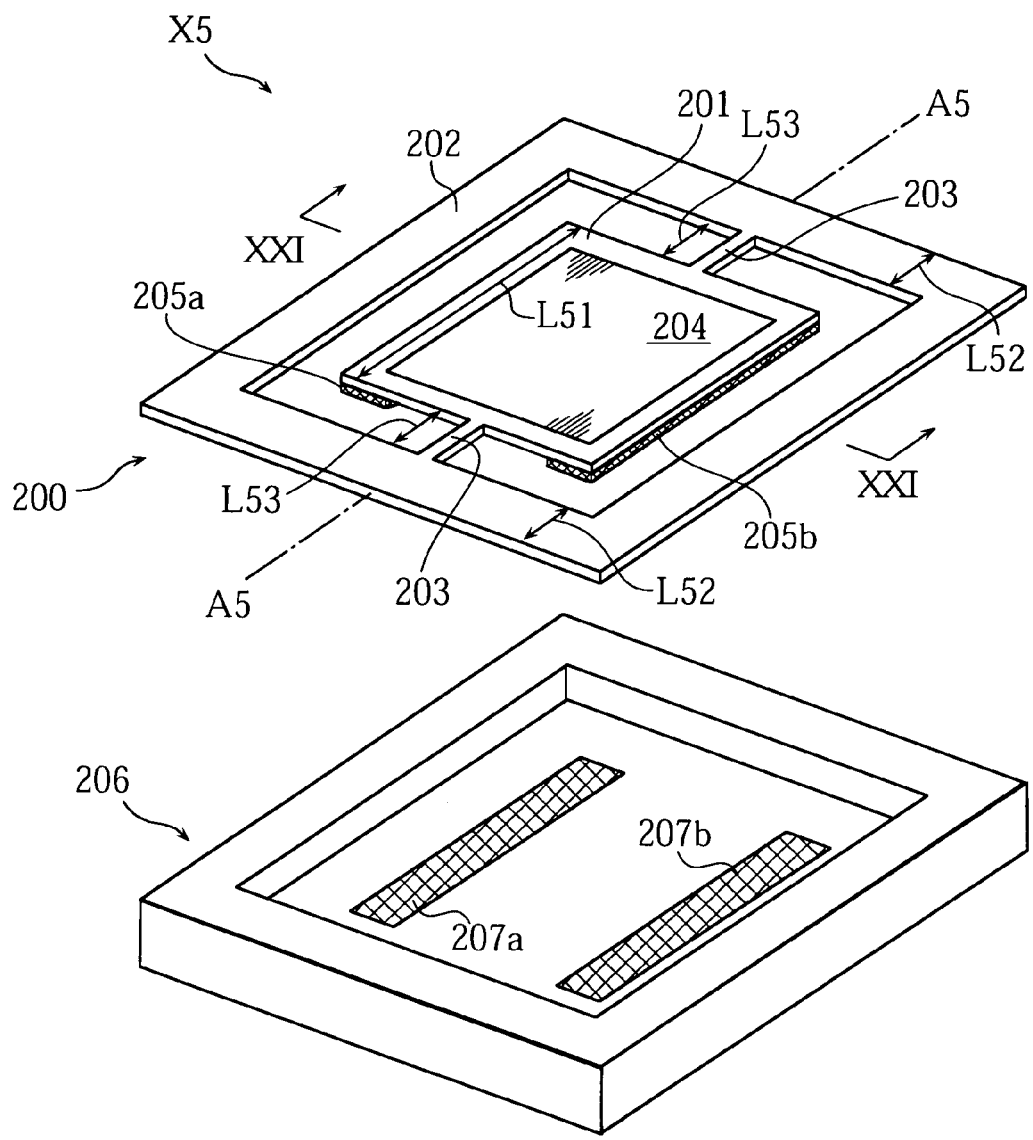
FIG. 20 is a perspective exploded view showing a conventional micro-mirror element.
Figure 21:
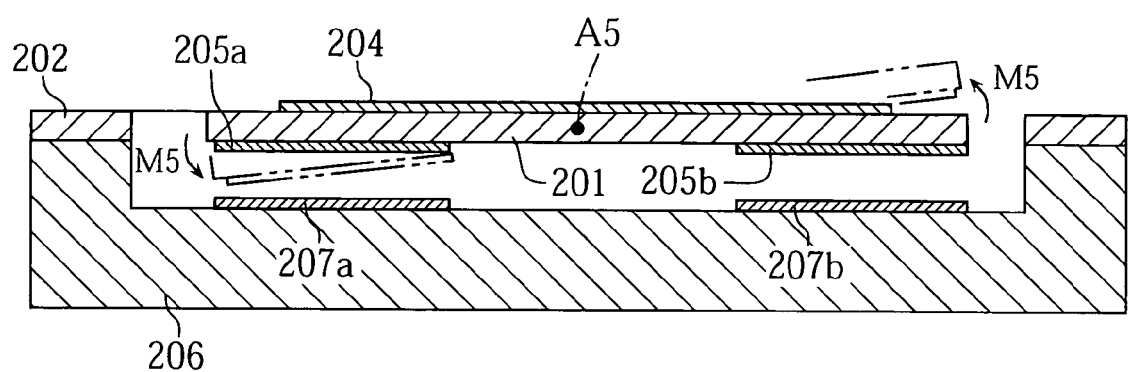
FIG. 21 is a sectional view taken along lines XXI—XXI in FIG. 20, with the components of the micro-mirror element assembled.

FIGS. 16–19 show a micro-mirror element X4 according to a fourth embodiment of the present invention. FIG. 16 is a plan view of the electrode X4. FIGS. 17, 18 and 19 are sectional views taken along lines XVII—XVII, XVIII—XVIII and XIX—XIX in FIG. 16, respectively.

The micro-mirror element X4 includes an oscillation member 80, an inner frame 91, an outer frame 92, torsion connectors 93–94, a beam 95, and comblike electrodes 96, 97, 98.

The oscillation member 80 includes a mirror supporting section 81, a comblike electrode 82, and a beam 83. The mirror supporting section 81 has an upper surface provided with a mirror 81a for light reflection. The mirror supporting section 81 may be made of an electroconductive silicon material, while the mirror 81a may be made of gold. In this specification, the assembly of the section 81 and the mirror 81a formed thereon may be referred to as a movable "functional part". As shown in FIG. 16, the mirror supporting section 81 has a length L1 in a range of 20–200 μm, for example. The structures of the comblike electrode 82 and the beam 83 are the same as those of the comblike electrode 12 and the beam 13.

The inner frame 91, which may be made of silicon, surrounds the oscillation member 80. Though not shown in the figure, the frame 91 is provided with an internal conduction path extending through the frame body. As shown in FIG. 16, the frame 91 has a length L3 in a range of 30–300 μm, for example. The length L3 is greater than the length L1 of the mirror supporting section 81.

The outer frame 92, which may be made of silicon, surrounds the inner frame 91. Though not shown in the figure, the frame 92 is provided with internal conduction path extending through the frame body.

The torsion connector 93 comprises a pair of torsion bars 93a. Each torsion bar 93a extends between the beam 83 of the oscillation member 80 and the inner frame 91 for connecting the beam 83 and the frame 91. As shown in FIG. 19, each torsion bar 93a is smaller in thickness than the beam 83 and the frame 91. The torsion connector 93 (the torsion bars 93a) defines a rotational axis A4 for the oscillation member 80 (and hence the mirror supporting section 81). As shown in FIG. 16, the axis A4 perpendicularly crosses the beam 83 extending in the D1-direction. Preferably, the axis A4 passes through or near the gravity center of the oscillation member 80. The torsion bars 93a may be made of an electroconductive silicon material, so that the above-mentioned internal conduction path (provided inside the frame 91) is electrically connected to the beam 83 via the torsion bars 93a.

As shown in FIG. 19, the comblike electrode 96 is fixed to the frame 91. In operation, an electrostatic force is generated between the comblike electrode 96 and the comblike electrode 82. The comblike electrode 96 may be made of an electroconductive silicon material, for example. The comblike electrode 96 and the comblike electrode 82, electrically separated from each other, provide a driving mechanism for the micro-mirror element X4. In a non-operating state or standby state of the oscillation member 80, as shown in FIGS. 17 and 19, the comblike electrodes 82, 96 are horizontal and located at different heights. Also, the electrodes 82, 96 are laterally offset from each other for avoiding interference which otherwise would occur when the oscillation member 80 is operated.

The beam 95, extending longitudinally in the D1-direction shown in FIG. 16, connects the inner frame 91 and the comblike electrode 97. The beam 95 has a length L4 in a range of 3–30 μm, for example. The length L4 is smaller than the length L3 of the inner frame 91. The beam 95 may be made of an electroconductive silicon material, for example.

The torsion connector 94 comprises a pair of torsion bars 94a. Each torsion bar 94a extends between the beam 95 and the outer frame 92 for connecting the beam 95 and the frame 92. As shown in FIG. 19, each torsion bar 94a is smaller in thickness than the beam 95 and the frame 92. the paired torsion bars 94a or torsion connector 94 defines a rotational axis A4' for the frame 91 and the oscillation member 80 (hence the mirror supporting section 81 as well). As shown in FIG. 16, the axis A4' perpendicularly crosses the beam 95 extending longitudinally in the D1-direction, and is parallel to the other axis A4. The torsion bars 94a, which may be made of an electroconductive silicon material, electrically connects the internal conduction path provided within the outer frame 92 and the beam 95.

The comblike electrodes 97 and 98, electrically separated from each other, provide a driving mechanism for the micro-mirror element X4. In operation, an electrostatic force is generated between the electrodes 97 and 98. The comblike electrode 97 is connected to the beam 95 electrically and mechanically. As shown in FIGS. 16 and 19, the electrode 98 is fixed to the outer frame 92. The electrical conduction between the beam 95 and the comblike electrode 97 may be realized by an electroconductive plug (not shown) embedded in the beam 95 and the electrode 97. In a non-operating state or standby state of the inner frame 91, as shown in FIGS. 18 and 19, the comblike electrodes 97, 98 are horizontal and located at different heights. Also, the comblike electrodes 97, 98 are laterally offset from each other for avoiding interference which otherwise would occur when the inner frame 91 is rotated. The electrodes 97, 98 may be made of an electroconductive silicon material, for example.

The micro-mirror element X4 may be fabricated from a material substrate by the MEMS technology, as described above with respect to the micro-mirror element X1 of the first embodiment.

In the micro-mirror element X4, the comblike electrodes 82, 96 are charged to an appropriate potential for causing the oscillation member 80 to rotate the axis A4. Further, in the electrode X4, it is possible to rotate the inner frame 91 together with the oscillation member 80 about the axis A4' by charging the comblike electrodes 97, 98 to an appropriate potential.

In the micro-mirror element X4, the torsion connector 93 defining the rotational axis A4 is connected to the beam 83, which is narrower than the mirror supporting section 81 and extends from the section 81. As shown in FIG. 16, the mirror supporting section 81 and the torsion connector 93 overlap with each other in the D2-direction (the longitudinal direction of the axis A4). Accordingly, the mirror supporting section 81 and the torsion connector 93 can be sufficiently long in the D2-direction, while the element X4 as a whole can be compact in the D2-direction. Similarly, the torsion connector 94 defining the rotational axis A4' is connected to the beam 95, which is narrower than the inner frame 91 and extends from the frame 91. Also, the frame 91 and the torsion connector 94 overlap with each other in the D2-direction. Thus, the frame 91 and the torsion connector 94 can be sufficiently long in the D2-direction, while the element X4 as a whole can be compact in the D2-direction. With a large mirror supporting section and long torsion connectors, proper light-reflecting performance will result.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

The invention claimed is:

1. A micro-oscillation element comprising:
   a first frame;
   a movable functional part;
   a first driving mechanism;
   a beam extending from the functional part to the driving mechanism; and
   a first torsion connector for connecting the frame and the beam to each other, the connector defining a first rotational axis about which the functional part rotates, the first rotational axis crossing a longitudinal direction of the beam;
   wherein the beam is shorter than the functional part in a longitudinal direction of the rotational axis.

2. The micro-oscillation element according to claim 1, wherein the driving mechanism includes a first comblike electrode and a second comblike electrode cooperating to generate electrostatic force, the first comblike electrode being fixed to the beam, the second comblike electrode being fixed to the frame.

3. The micro-oscillation element according to claim 1, further comprising a second driving mechanism which is connected to the functional part and is opposite in position to the beam with respect to the functional part.

4. The micro-oscillation element according to claim 3, wherein the first driving mechanism and the second driving mechanism generate driving force to rotate the functional part in a same direction.

5. The micro-oscillation element according to claim 3, wherein the second driving mechanism includes a first comblike electrode and a second comblike electrode cooperating to generate electrostatic force, the first comblike electrode being fixed to the functional part, the second comblike electrode being fixed to the frame.

6. The micro-oscillation element according to claim 1, further comprising a second frame, a second torsion connector and an additional driving mechanism, wherein the second torsion connector connects the first frame and the second frame to each other and defines a second rotational axis for additional rotation of the first frame, the additional driving mechanism being arranged to generate driving force for the additional rotation of the first frame.

7. The micro-oscillation element according to claim 6, wherein the first rotational axis and the second rotational axis are parallel to each other.

8. The micro-oscillation element according to claim 1, further comprising a posture adjusting mechanism for individually exerting posture adjusting force on two areas of the functional part that are spaced from each other in the longitudinal direction of the rotational axis.

9. The micro-oscillation element according to claim 8, wherein the posture adjusting mechanism includes a first flat electrode and a second flat electrode both facing the functional part, the first flat electrode and the second flat electrode being spaced from each other in the longitudinal direction of the rotational axis.

10. A micro-oscillation element comprising:
    a frame;
    an oscillation member that includes a movable functional part, a first electrode, and a beam extending from the functional part to the first electrode;
    a torsion connector for connecting the frame and the beam to each other, the connector defining a rotational axis about which the oscillation member rotates, the rotational axis crossing a longitudinal direction of the beam; and
    a second electrode cooperating with the first electrode to generate driving force for the rotation of the oscillation member;
    wherein the beam is shorter than the functional part in the longitudinal direction of the rotational axis.

11. The micro-oscillation element according to claim 10, wherein the first electrode comprises a comblike electrode, the second electrode comprising another comblike electrode fixed to the frame.

12. The micro-oscillation element according to claim 10, further comprising a base member, wherein the first electrode comprises a flat plate electrode, the second electrode comprising another flat plate electrode provided on the base member to face the first electrode.

13. The micro-oscillation element according to claim 10, further comprising a third electrode and a fourth electrode, wherein the third electrode is fixed to the functional part and is opposite in position to the beam with respect to the functional part, the fourth electrode cooperating with the third electrode to generate driving force for the rotation of the oscillation member.

14. The micro-oscillation element according to claim 13, wherein the third electrode comprises a comblike electrode, the fourth electrode comprising another comblike electrode fixed to the frame.

15. A micro-oscillation element comprising:
    a first frame and a second frame;
    a movable functional part;
    a first driving mechanism and a second driving mechanism;
    a first beam extending from the functional part to the first driving mechanism;
    a first torsion connector for connecting the first frame and the first beam to each other, the first torsion connector defining a first rotational axis about which the functional part rotates, the first rotational axis crossing a longitudinal direction of the first beam;
    a second beam extending from the first frame to the second driving mechanism; and
    a second torsion connector for connecting the second frame and the second beam to each other, the second torsion connector defining a second rotational axis about which the first frame rotates, the second rotational axis crossing a longitudinal direction of the second beam;
    wherein the first beam is shorter than the functional part in a longitudinal direction of the first rotational axis, the second beam being shorter than the first frame in a longitudinal direction of the second rotational axis.

16. The micro-oscillation element according to claim 15, wherein the first rotational axis and the second rotational axis are parallel to each other.

17. The micro-oscillation element according to claim 15, wherein the first driving mechanism includes a first comblike electrode and a second comblike electrode cooperating to generate electrostatic force, the first comblike electrode being fixed to the first beam, the second comblike electrode being fixed to the first frame.

18. The micro-oscillation element according to claim 15, wherein the second driving mechanism includes a first comblike electrode and a second comblike electrode cooperating to generate electrostatic force, the first comblike electrode being fixed to the second beam, the second comblike electrode being fixed to the second frame.

* * * * *